(12) United States Patent
Ghanea-Hercock

(10) Patent No.: US 11,562,293 B2
(45) Date of Patent: Jan. 24, 2023

(54) ADAPTATION OF MACHINE LEARNING ALGORITHMS

(71) Applicant: British Telecommunications Public Limited Company, London (GB)

(72) Inventor: Robert Ghanea-Hercock, London (GB)

(73) Assignee: British Telecommunications Public Limited Company, London (GB)

( * ) Notice: Subject to any disclaimer, the term of this patent is extended or adjusted under 35 U.S.C. 154(b) by 566 days.

(21) Appl. No.: 16/611,694

(22) PCT Filed: May 3, 2018

(86) PCT No.: PCT/EP2018/061406
§ 371 (c)(1),
(2) Date: Nov. 7, 2019

(87) PCT Pub. No.: WO2018/206406
PCT Pub. Date: Nov. 15, 2018

(65) Prior Publication Data
US 2021/0142206 A1 May 13, 2021

(30) Foreign Application Priority Data
May 8, 2017 (EP) .................. 17170020

(51) Int. Cl.
*G06N 20/00* (2019.01)
*G06F 9/448* (2018.01)
*G06F 21/60* (2013.01)

(52) U.S. Cl.
CPC ............. *G06N 20/00* (2019.01); *G06F 9/448* (2018.02); *G06F 21/602* (2013.01)

(58) Field of Classification Search
CPC ...................................... G06N 20/00
See application file for complete search history.

(56) References Cited

U.S. PATENT DOCUMENTS 6,192,405 B1   2/2001   Bunnell
7,716,739 B1   5/2010   Mccorkendale
(Continued)

FOREIGN PATENT DOCUMENTS

EP   2381363 A2   10/2011
EP   2101599      9/2013
(Continued)

OTHER PUBLICATIONS

"A Next-Generation Smart Contract and Decentralized Application Platform" Ethereum White Paper, 2016, retrieved from https://github.com/ethereum/wiki/wiki/White-Paper on Nov. 13, 2018, 40 pages.
(Continued)

*Primary Examiner* — Olugbenga O Idowu
(74) *Attorney, Agent, or Firm* — Patterson Thuente, P.A.

(57) ABSTRACT

A computer implemented method of executing a software module includes a machine learning algorithm as an executable software component configurable to approximate a function relating a domain data set to a range data set; a data store; and a message handler as an executable software component arranged to receive input data and communicate output data for the module, wherein the message handler is adapted to determine domain parameters for the algorithm based on the input data and to generate the output data based on a result generated by the algorithm, the method including generating a message as input data for the module, the message including instructions for execution by the module to effect a modification of the machine learning algorithm of the module.

13 Claims, 10 Drawing Sheets

(56) References Cited

U.S. PATENT DOCUMENTS

| | | | |
|---|---|---|---|
| 7,797,748 B2 | 9/2010 | Zheng et al. | |
| 7,870,153 B2 | 1/2011 | Croft et al. | |
| 8,271,974 B2 | 9/2012 | Mazhar et al. | |
| 8,375,437 B2 | 2/2013 | Linsley et al. | |
| 8,479,294 B1 | 7/2013 | Li et al. | |
| 8,516,241 B2 | 8/2013 | Chang et al. | |
| 8,739,155 B2 | 5/2014 | Hehir et al. | |
| 9,009,825 B1 | 4/2015 | Chang et al. | |
| 9,183,378 B2 | 11/2015 | Banerjee et al. | |
| 9,235,813 B1 | 1/2016 | Qian et al. | |
| 9,466,051 B1 | 10/2016 | Roth et al. | |
| 9,495,668 B1 | 11/2016 | Juels et al. | |
| 9,807,106 B2 | 10/2017 | Daniel et al. | |
| 9,835,813 B1 | 12/2017 | Zhu et al. | |
| 10,726,356 B1 | 7/2020 | Zarandioon et al. | |
| 10,878,335 B1* | 12/2020 | Waugh | G06F 40/30 |
| 2002/0100035 A1 | 7/2002 | Kenyon et al. | |
| 2002/0120725 A1 | 8/2002 | Dacosta et al. | |
| 2003/0084349 A1 | 5/2003 | Friedrichs et al. | |
| 2003/0204644 A1 | 10/2003 | Vincent | |
| 2004/0015977 A1 | 1/2004 | Benke et al. | |
| 2004/0268296 A1 | 12/2004 | Kayam et al. | |
| 2005/0091269 A1 | 4/2005 | Gerber et al. | |
| 2006/0282660 A1 | 12/2006 | Varghese et al. | |
| 2009/0254499 A1 | 10/2009 | Deyo | |
| 2010/0011029 A1 | 1/2010 | Niemelae | |
| 2010/0262873 A1 | 10/2010 | Chang et al. | |
| 2010/0317420 A1 | 12/2010 | Hoffberg | |
| 2011/0197070 A1 | 8/2011 | Mizrah | |
| 2011/0265154 A1 | 10/2011 | Furlan et al. | |
| 2012/0053925 A1 | 3/2012 | Geffin et al. | |
| 2012/0215727 A1 | 8/2012 | Malik et al. | |
| 2012/0246290 A1 | 9/2012 | Kagan | |
| 2012/0284794 A1 | 11/2012 | Trent et al. | |
| 2012/0304007 A1 | 11/2012 | Hanks et al. | |
| 2012/0311526 A1 | 12/2012 | Deanna et al. | |
| 2013/0006949 A1 | 1/2013 | Essawi et al. | |
| 2014/0067734 A1 | 3/2014 | Hawkins et al. | |
| 2014/0164251 A1 | 6/2014 | Loh | |
| 2014/0180738 A1 | 6/2014 | Phillipps et al. | |
| 2014/0215490 A1 | 7/2014 | Mathur et al. | |
| 2014/0298011 A1 | 10/2014 | Ganesan | |
| 2014/0344015 A1 | 11/2014 | Puértolas-Montañés et al. | |
| 2014/0358825 A1 | 12/2014 | Phillipps et al. | |
| 2014/0372346 A1 | 12/2014 | Phillipps et al. | |
| 2015/0120567 A1 | 4/2015 | Van et al. | |
| 2015/0134606 A1 | 5/2015 | Magdon-Ismail et al. | |
| 2015/0227741 A1 | 8/2015 | Permeh et al. | |
| 2015/0271318 A1 | 9/2015 | Antos et al. | |
| 2015/0332283 A1 | 11/2015 | Witchey | |
| 2015/0332395 A1 | 11/2015 | Walker et al. | |
| 2015/0356523 A1 | 12/2015 | Madden | |
| 2015/0356555 A1 | 12/2015 | Pennanen et al. | |
| 2015/0363876 A1 | 12/2015 | Ronca et al. | |
| 2015/0379423 A1 | 12/2015 | Dirac et al. | |
| 2016/0048771 A1 | 2/2016 | Chen et al. | |
| 2016/0057041 A1 | 2/2016 | Gupta et al. | |
| 2016/0078367 A1 | 3/2016 | Adjaoute | |
| 2016/0086175 A1 | 3/2016 | Finlow-Bates et al. | |
| 2016/0098730 A1 | 4/2016 | Feeney | |
| 2016/0164884 A1 | 6/2016 | Sriram et al. | |
| 2016/0221186 A1 | 8/2016 | Perrone | |
| 2016/0260095 A1 | 9/2016 | Ford | |
| 2016/0283920 A1 | 9/2016 | Fisher et al. | |
| 2016/0321654 A1 | 11/2016 | Lesavich et al. | |
| 2016/0350173 A1 | 12/2016 | Ahad | |
| 2017/0063886 A1 | 3/2017 | Muddu et al. | |
| 2017/0109735 A1 | 4/2017 | Sheng et al. | |
| 2017/0124534 A1 | 5/2017 | Savolainen et al. | |
| 2017/0279774 A1 | 9/2017 | Booz et al. | |
| 2017/0279818 A1 | 9/2017 | Milazzo et al. | |
| 2017/0286136 A1 | 10/2017 | Dimitrakos et al. | |
| 2017/0372226 A1* | 12/2017 | Costa | G06F 21/60 |
| 2018/0018579 A1* | 1/2018 | Xu | G06N 20/00 |
| 2018/0025166 A1 | 1/2018 | Daniel et al. | |
| 2018/0144114 A1 | 5/2018 | Fiske et al. | |
| 2018/0225466 A1 | 8/2018 | Ducatel et al. | |
| 2018/0225469 A1 | 8/2018 | Daniel et al. | |
| 2018/0225611 A1 | 8/2018 | Daniel et al. | |
| 2018/0232526 A1 | 8/2018 | Reid et al. | |
| 2018/0232663 A1* | 8/2018 | Ross | G06N 20/00 |
| 2018/0285585 A1 | 10/2018 | Daniel et al. | |
| 2019/0036895 A1 | 1/2019 | Irvine | |
| 2019/0050541 A1 | 2/2019 | Wright et al. | |
| 2019/0139136 A1 | 5/2019 | Molinari et al. | |
| 2019/0339687 A1 | 11/2019 | Cella et al. | |

FOREIGN PATENT DOCUMENTS

| | | |
|---|---|---|
| EP | 2816469 A1 | 12/2014 |
| EP | 3101599 | 12/2016 |
| GB | 2540976 | 2/2017 |
| GB | 2540977 | 2/2017 |
| WO | WO-0184285 A2 | 11/2001 |
| WO | WO-2012117253 A1 | 9/2012 |
| WO | WO-2013172750 A1 | 11/2013 |
| WO | WO-2015128612 A1 | 9/2015 |
| WO | WO-2015179020 A2 | 11/2015 |
| WO | WO-2016034496 A1 | 3/2016 |
| WO | WO2016077127 | 5/2016 |
| WO | WO-2016191639 A1 | 12/2016 |
| WO | WO-2017021153 A1 | 2/2017 |
| WO | WO-2017021154 A1 | 2/2017 |
| WO | WO-2017021155 A1 | 2/2017 |
| WO | WO2017054985 | 4/2017 |
| WO | WO-2017167547 A1 | 10/2017 |
| WO | WO-2017167548 A1 | 10/2017 |
| WO | WO-2017167549 A1 | 10/2017 |
| WO | WO-2017167550 A1 | 10/2017 |
| WO | WO-2018178026 A1 | 10/2018 |
| WO | WO-2018178034 A1 | 10/2018 |
| WO | WO-2018178035 A1 | 10/2018 |
| WO | WO-2018206374 A1 | 11/2018 |
| WO | WO-2018206405 A1 | 11/2018 |
| WO | WO-2018206406 A1 | 11/2018 |
| WO | WO-2018206407 A1 | 11/2018 |
| WO | WO-2018206408 A1 | 11/2018 |
| WO | WO-2018228950 | 12/2018 |
| WO | WO-2018228951 | 12/2018 |
| WO | WO-2018228952 | 12/2018 |
| WO | WO-2018228973 | 12/2018 |
| WO | WO-2018228974 | 12/2018 |

OTHER PUBLICATIONS

Adler M., "Threat Intelligence Visibility—the way forward," BT, 2015, available from www.globalservices.bt.com/uk/en/products/assure threat_ monitoring, 8 pages.

Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.

Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.

Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.

Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.

Anonymous, "Colored Coins—Bitcoin Wiki," Retrieved from https://en.bitcoin.it/w/index.php?title=ColoredCoins&oldid=57259, Jul. 7, 2015, 6 pages.

(56) References Cited

OTHER PUBLICATIONS

Anonymous, "Who Will Protect Users From Ethereum Based Malware? : Ethereum," Mar. 28, 2016, Retrieved from https://www.reddit.com/r/ethereum/comments/4ccfaa/who_will_protect_users_from_ethereum_based_malware/?st=itbp2q49&sh=d8cc4355 on Nov. 13, 2018, 3 pages.
Application and Filing History for U.S. Appl. No. 16/611,682, filed Nov. 7, 2019, , Inventor(s): Ghanea_Hercock.
Application and File History for U.S. Appl. No. 16/611,701, filed Nov. 7, 2019, Inventor(s): Ghanea_Hercock.
Application and File History for U.S. Appl. No. 16/611,707, filed Nov. 7, 2019, Inventor(s): Ghanea_Hercock.
Application and Filing History for U.S. Appl. No. 16/611,686, filed Nov. 7, 2019, Inventor(s): Ghanea_Hercock.
Application and Filing History for U.S. Appl. No. 15/548,654, filed Aug. 3, 2017, Inventor(s): Daniel.
Zupan B., et al., "Machine Learning by Function Decomposition," ICML 1997, Retrieved from https://citeseerx.ist.psu.edu/viewdoc/download?doi=10.1.1.29.4455&rep=repl&type=pdf on Oct. 17, 2017, 9 pages.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
Assia Y., et al., "Colored Coins Whitepaper," 2015, available at docs.google.com/document/d/1AnkPcVZTCMLizw4DvsW6M8Q2JCOllzrTLuoWu2z1BE, 23 pages.
Bakshi, et al., "Securing Cloud from DDOS Attacks Using Intrusion Detection System in Virtual Machine," IEEE, 2010, 5 pages.
Bellifemine, et al., "Jade: A Software Framework for Developing Multi-Agent Applications. Lessons Learned," Elsevier, 2007, 12 pages.
Benders J.F., "Partitioning Procedures for Solving Mixed Variables Programming Problems," 1962, vol. 4, pp. 238-252.
Billaudelle S., et al., "Porting HTM Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff-Institute for Physics, May 2015, 9 pages.
Biryukov A., et al., "R&D in Smart Contracts, Cryptocurrency and Blockchain," University of Luxembourg, Jan. 19, 2016, XP055306767, Retrieved from http://wwwfr.uni.lu/snt/news_events/speaker_s_presentations on Sep. 29, 2016, pp. 51 pages.
Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.
Bonneau J., et al., "Research Perspectives and Challenges for Bitcoin and Cryptocurrencies," International Association for Cryptologic Research, Mar. 19, 2015, 18 pages.
Chaisiri, "Optimization of Resource Provisioning Cost in Cloud Computing," IEEE Transactions on Services Computing, Apr.-Jun. 2012, vol. 5 (2), 14 pages.
Combined Search and Examination Report for Great Britain Application No. 1707377.6, dated Nov. 9, 2017, 9 pages.
Combined search and Examination Report under Sections 17 and 18(3) for Great Britain Application No. 1707376.8, dated Nov. 9, 2017, 8 pages.
Combined search and Examination Report under Sections 17 and 18(3) for Great Britain Application No. 1707378.4, dated Nov. 9, 2017, 11 pages.
Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.
Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.
Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.
Czepluch J.S., et al., "The Use of Block Chain Technology in Different Application Domains," XP055242451, retrieved from http://http://www.Iollike.org/bachelor.pdf, May 20, 2015, 109 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
European Search Report for Application No. EP17164006.3, dated Jun. 29, 2017, 6 pages.
Extended European Search Report for Application No. 17170020.6, dated Nov. 10, 2017, 8 pages.
Extended European Search Report for Application No. 17170022.2, dated Nov. 16, 2017, 8 pages.
Extended European Search Report for Application No. EP15179440.1, dated Feb. 10, 2016, 6 pages.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., in "On Intelligence, How a New Understanding of the Brain Will Lead to the Creation of Truly Intelligent Machines," 2004, Times Books, ISBN 0-8050-7 456-2, Jul. 14, 2005, 174 pages.
Hawkins, et al., "Why Neurons Have Thousands of Synapses, A Theory of Sequence Memory in Neocortex," Published in Frontiers in Neural Circuits (10 (2016) 1-13, doi:l0.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.
International Preliminary Report for Application No. PCT/EP2018/061261, dated Nov. 21, 2019, 8 pages.
International Preliminary Report on Patentability for Application No. PCT/EP2015/069670, dated Mar. 16, 2017, 7 pages.
International Preliminary Report on Patentability for Application No. PCT/EP2015/069673, dated Mar. 16, 2017, 9 pages.
International Preliminary Report on Patentability for Application No. PCT/EP2016/052865, dated Aug. 24, 2017, 9 pages.
International Preliminary Report on Patentability for Application No. PCT/EP2016/067308, dated Feb. 15, 2018, 7 pages.
International Preliminary Report on Patentability for Application No. PCT/EP2016/067309, dated Feb. 15, 2018, 7 pages.
International Preliminary Report on Patentability for Application No. PCT/EP2016/067310, dated Feb. 15, 2018, 8 pages.
International Search Report and Written Opinion for Application No. PCT/EP2018/061405, dated Jun. 20, 2018, 12 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Preliminary Report on Patentability for Application No. PCT/EP2018/057674, dated Oct. 10, 2019, 8 pages.
International Preliminary Report on Patentability for Application No. PCT/EP2018/057685, dated Oct. 10, 2019, 9 pages.
International Preliminary Report on Patentability for Application No. PCT/EP2018/057686, dated Oct. 10, 2019, 8 pages.
International Preliminary Report on Patentability for Application No. PCT/EP2018/061405, dated Nov. 21, 2019, 7 pages.
International Preliminary Report on Patentability for Application No. PCT/EP2018/061406, dated Nov. 21, 2019, 8 pages.
International Preliminary Report on Patentability for Application No. PCT/EP2018/061407, dated Nov. 21, 2019, 8 pages.

(56) References Cited

OTHER PUBLICATIONS

International Preliminary Report on Patentability for Application No. PCT/EP2018/061408, dated Nov. 21, 2019, 10 pages.
International Preliminary Report on Patentability forApplication No. PCT/EP2017/055094, dated Oct. 11, 2018, 8 pages.
International Search Report and Written Opinion for Application No. PCT/EP2015/069670, dated Nov. 11, 2015, 8 pages.
International Search Report and Written Opinion for Application No. PCT/EP2015/069673, dated Nov. 12, 2015, 10 pages.
International Search Report and Written Opinion for Application No. PCT/EP2016/052865, dated Mar. 17, 2016, 11 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055094, dated May 15, 2017, 10 pages.
International Search Report and Written Opinion for Application No. PCT/EP2017/055095, dated Apr. 11, 2017, 10 pages.
International Search Report and Written Opinion for Application No. PCT/EP2018/057674, dated May 2, 2018, 10 pages.
International Search Report and Written Opinion for Application No. PCT/EP2018/057685, dated Jun. 1, 2018, 11 pages.
International Search Report and Written Opinion for Application No. PCT/EP2018/057686, dated Apr. 20, 2018, 10 pages.
International Search Report and Written Opinion for Application No. PCT/EP2018/061261, dated Jun. 20, 2018, 13 pages.
International Search Report and Written Opinion for Application No. PCT/EP2018/061407, dated Jun. 20, 2018, 13 pages.
International Search Report and Written Opinion for Application No. PCT/EP2018/061408, dated Jun. 20, 2018, 15 pages.
International Search Report and Written Opinion for PCT Application No. PCT/EP2016/067308, dated Sep. 21, 2016, 8 pages.
International Preliminary Report on Patentabilityfor Application No. PCT/EP2017/055095, dated Oct. 11, 2018, 8 pages.
Jin, et al., "A Guest-Transparent File Integrity Monitoring Method In Virtualization Environment," Elsevier, 2010, 11 pages.
Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.
Miller A., "The State-of-the-Art of Smart Contracts," FinTech R&D Innovation Conference, Luxemburg, Jan. 19, 2016, Retrieved from URL: http://wwwfr.uni.lu/snt/news_events/speaker_s_presentations on Sep. 29, 2016, 29 pages.
Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," (Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, A Strategy Employed by VI?," Olshausen, B.A., Field, D.J., 1997, Vision Research, 37:3311-3325) retrieved on Mar. 28, 2018 from http://www.chaos.gwdg.de/michael/CNScourse_2004/papersmax/OlshausenFieldl997.pdf, Dec. 24, 1996, 15 pages.
Patel H, "A block chain based decentralized exchange," International Association for Cryptologic Research, XP061017563, Dec. 18, 2014, vol. 20141225:065012, 9 pages.
Plohmann D., et al., "Case study of the Miner Botnet," 4th International Conference on Cyber Conflict, Jun. 5, 2012, pp. 345-360.
Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.
Rosenfeld M., "Overview of Colored Coins," https:1/bravenewcoin.com/assets/Whitepapers/Overview-of-Colored-Coins.pdf, Dec. 4, 2012, 13 pages.
Search Report dated Nov. 8, 2017 for Great Britain Application No. GB1707381.8, 7 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
Tschorsch F., et al., "Bitcoin and Beyond: A Technical Survey on Decentralized Digital Currencies," International Association for Cryptologic Research, May 15, 2015, pp. 1-37.
Wang Z., "The Applications of Deep Learning on Traffic Identification," 2012, Advances in Neural Information Processing Systems, 2015, 10 pages.
Wikipedia, "Blockchain (database)—Wikipedia," Nov. 29, 2015, retrieved from https://en.wikipedia.org/w/index.php?title=Block_chain_(database)&oldid=692921608 on Nov. 13, 2018, pp. 1-5.
Wu J., et al., "Hierarchical Temporal Memory Method for Time-Series-Based Anomaly Detection," 2016, IEEE, 16th International Conference Data Mining Workshops, XP033055893, Dec. 2016, pp. 1167-1172. .
Zambonelli, et al., "Agent-Oriented Software Engineering for Internet Applications," Coordination of Internet Agents: Models, Technologies, and Applications, Chapter—13, Springer, 2000, 21 pages.
Extended European Search Report; European Application No. 17170024.8; dated Nov. 10, 2017, 10 pages.
International Search Report and Written Opinion; International Application No. PCT/EP2018/061406; dated Jun. 20, 2018, 13 pages.
GB Combined Search and Examination Report; GB Application No. GB1707379.2; dated Nov. 9, 2017; 9 pages.
Antonopoulos, Andreas M., "Mastering Bitcoin. Unlocking Digital Crypto-Currencies.", O'Reilly Media, Apr. 2014, 282 pages.
"5 Yahoo! Pipes alternatives that are actually better than Pipes," https://www.import.io/post/5-yahoo-pipes-alternatives-that-are-actually-better-than-pipes/ -, Jul. 9, 2015, 5 pages.
Bengio Y., et al., "Deep learning," Nature, vol. 521, May 2015, 10 pages.
Bishop M.C., "Pattern Recognition and Machine Learning," Springer, Mar. 29, 2006, 758 pages.
Bradshaw., et al., "Introduction to Software Agents," AAAI Press/The MIT Press, 1997, 47 pages.
Buterin V., "Bootstrapping A Decentralized Autonomous Corporation: Part I," Sep. 20, 2013, Bitcoin Magazine (News). Retrieved on May 23, 2016, 9 pages.
Castillo A., et al., "Bitcoin: A Primer for Policymakers," Aug. 2013, Fairfax, VA: Mercatus Center, George Mason University, Oct. 22, 2013, 49 pages.
Communication pursuant to Article 94(3) EPC for Application No. 18719930.2 dated Dec. 21, 2021, 9 pages.
Communication pursuant to Article 94(3) EPC for Application No. 18719950.0 dated Dec. 21, 2021, 8 pages.
Communication pursuant to Article 94(3) EPC for Application No. 18719951.8 dated Dec. 21, 2021, 9 pages.
Communication pursuant to Article 94(3) EPC for Application No. 18719952.6 dated Dec. 21, 2021, 7 pages.

(56) References Cited

OTHER PUBLICATIONS

Communication pursuant to Article 94(3) EPC for Application No. 18719953.4 dated Dec. 21, 2021, 10 pages.
Dev, Bitcoin Mining Acceleration and Performance Quantification, IEEE, May 7, 2014, pp. 1-6.
Dill K., et al., "Nuts and Bolts: Modular Al from the Ground Up," Mar. 14-18, 2016, Game Developers Conference, 38 pages.
Extended European Search Report for Application No. 17170021.4, dated Nov. 10, 2017, 7 pages.
Extended European Search Report for Application No. 17170023.0, dated Nov. 10, 2017, 7 pages.
Hastie T., et al., "The Elements of Statistical Learning," Springer, 2003, 764 pages.
Hochreiter S., et al., "Long short-term memory". Neural Computation. 9 (8), DOI: 10.1162/neco.1997.9.8.1735, Source: PubMed, 33 pages.
Huizinga ., et al., "Evolving neural networks that are both modular and regular: HyperNEAT plus the Connection Cost Technique," Proceedings of the Genetic and Evolutionary Computation Conference, Jul. 2014, pp. 697-704.
Kelleher J.D., et al., "Fundamentals of Machine Learning for Predictive Data Analytics: Algorithms, Worked Examples, and Case Studies," MIT Press, 2015, 691 pages.
Mitchell T.M., "Machine Learning," McGraw-Hill, Mar. 1, 1997, 421 pages.
Norta A., "Creation of Smart-Contracting Collaborations for Decentralized Autonomous Organizations," Aug. 18, 2015, Perspectives in Business Informatics Research, vol. 229 of the series Lecture Notes in Business Information Processing, 16 pages.
Peter F., "Machine Learning: The Art and Science of Algorithms that Make Sense of Data," Cambridge, 2012, 416 pages.
Price R., "Digital currency Ethereum is cratering amid claims of a $50 million hack," Jun. 17, 2016, Business Insider, 12 pages.
Rojas P., "Modular Neural Networks," Springer-Verlag, 1996, see web reference: https://page.mi.fu-berlin.de/rojas/neural/chapter/K16.pdf , 16 pages.
Wikipedia: "Binary Classification," 2021, 5 pages.
Wikipedia: "Serialization," 2022, 6 pages.

* cited by examiner

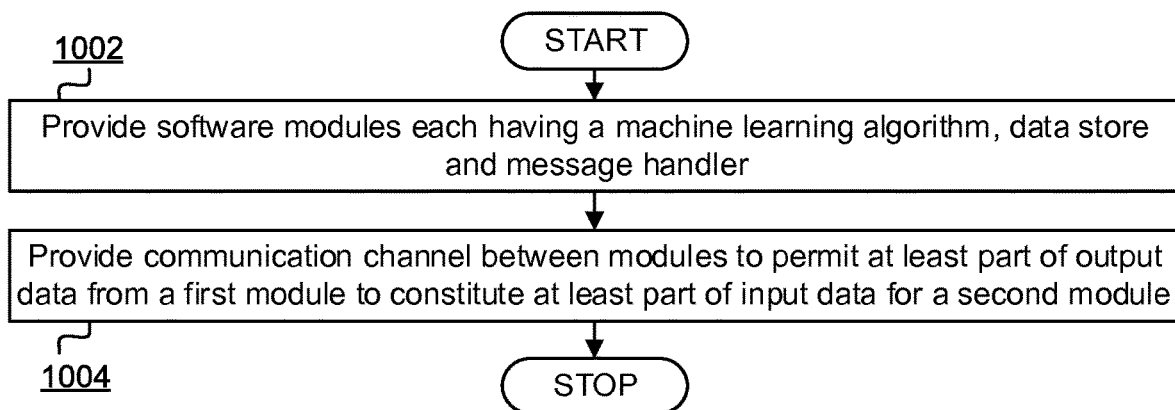
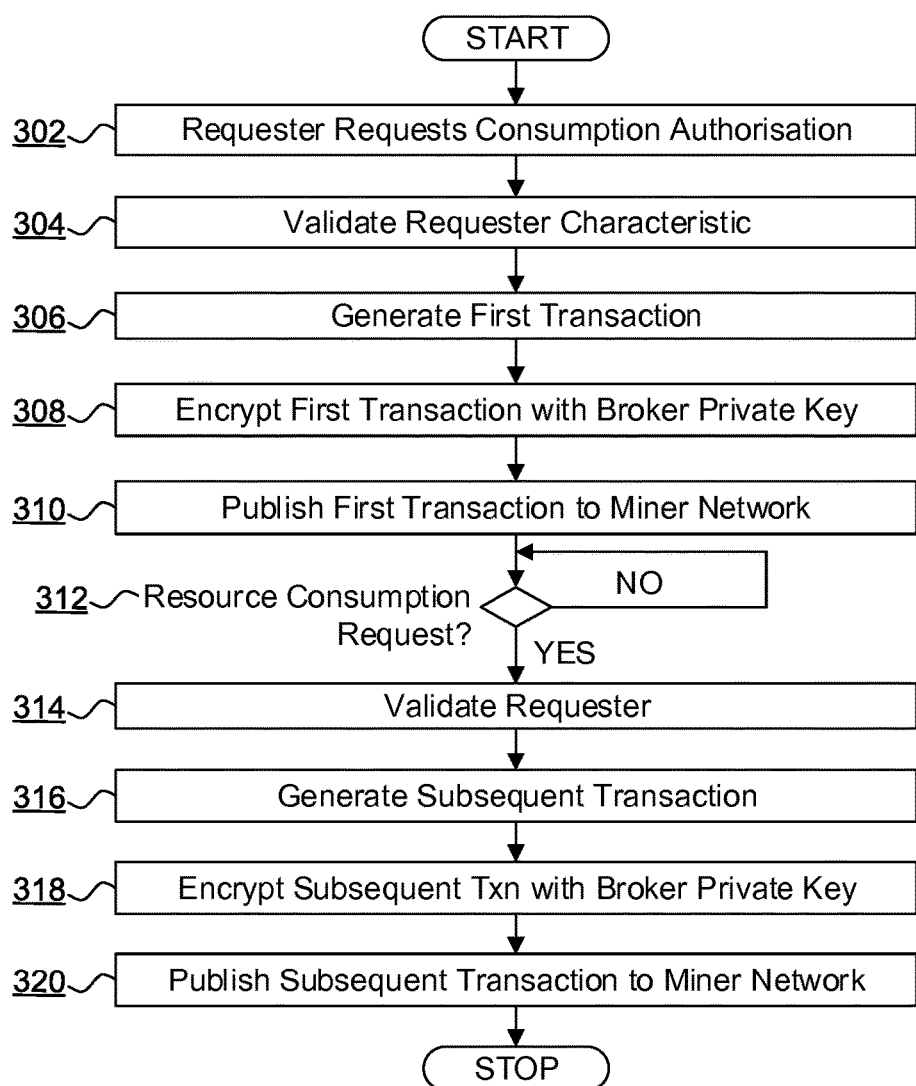

ADAPTATION OF MACHINE LEARNING ALGORITHMS

CROSS-REFERENCE TO RELATED APPLICATIONS

The present application is a National Phase entry of PCT Application No. PCT/EP2018/061406, filed May 3, 2018, which claims priority from European Patent Application No. 17170020.6 filed May 8, 2017, each of which is fully incorporated herein by reference.

TECHNICAL FIELD

The present disclosure relates to the provision of machine learning algorithms and the execution of machine learning algorithms.

BACKGROUND

Machine learning algorithms are increasingly deployed to address challenges that are unsuitable for being, or too costly to be, addressed using traditional computer programming techniques. Increasing data volumes, widening varieties of data and more complex system requirements tend to require machine learning techniques. It can therefore be necessary to produce models that can analyze larger, more complex data sets and deliver faster, more accurate results and preferably without programmer intervention.

Many different machine learning algorithms exist and, in general, a machine learning algorithm seeks to approximate an ideal target function, $f$, that best maps input variables x (the domain) to output variables y (the range), thus:

$$y = f(x)$$

The machine learning algorithm as an approximation of $f$ is therefore suitable for providing predictions of y. Supervised machine learning algorithms generate a model for approximating $f$ based on training data sets, each of which is associated with an output y. Supervised algorithms generate a model approximating $f$ by a training process in which predictions can be formulated based on the output y associated with a training data set. The training process can iterate until the model achieves a desired level of accuracy on the training data.

Other machine learning algorithms do not require training. Unsupervised machine learning algorithms generate a model approximating $f$ by deducing structures, relationships, themes and/or similarities present in input data. For example, rules can be extracted from the data, a mathematical process can be applied to systematically reduce redundancy, or data can be organized based on similarity.

Semi-supervised algorithms can also be employed, such as a hybrid of supervised and unsupervised approaches.

Notably, the range, y, of $f$ can be, inter alia: a set of classes of a classification scheme, whether formally enumerated, extensible or undefined, such that the domain x is classified e.g. for labeling, categorizing, etc.; a set of clusters of data, where clusters can be determined based on the domain x and/or features of an intermediate range y'; or a continuous variable such as a value, series of values or the like.

Regression algorithms for machine learning can model $f$ with a continuous range y.

Examples of such algorithms include: Ordinary Least Squares Regression (OLSR); Linear Regression; Logistic Regression; Stepwise Regression; Multivariate Adaptive Regression Splines (MARS); and Locally Estimated Scatterplot Smoothing (LOESS).

Clustering algorithms can be used, for example, to infer $f$ to describe hidden structure from data including unlabelled data. Such algorithms include, inter alia: k-means; mixture models; neural networks; and hierarchical clustering. Anomaly detection algorithms can also be employed.

Classification algorithms address the challenge of identifying which of a set of classes or categories (range y) one or more observations (domain x) belong. Such algorithms are typically supervised or semi-supervised based on a training set of data. Algorithms can include, inter alia: linear classifiers such as Fisher's linear discriminant, logistic regression, Naive Bayes classifier; support vector machines (SVMs) such as a least squares support vector machine; quadratic classifiers; kernel estimation; decision trees; neural networks; and learning vector quantization.

While the detailed implementation of any machine learning algorithm is beyond the scope of this description, the manner of their implementation will be familiar to those skilled in the art with reference to relevant literature including, inter alia: "Machine Learning" (Tom M. Mitchell, McGraw-Hill, 1 Mar. 1997); "Elements of Statistical Learning" (Hastie et al, Springer, 2003); "Pattern Recognition and Machine Learning" (Christopher M. Bishop, Springer, 2006); "Machine Learning: The Art and Science of Algorithms that Make Sense of Data" (Peter Flach, Cambridge, 2012); and "Fundamentals of Machine Learning for Predictive Data Analytics: Algorithms, Worked Examples, and Case Studies" (John D. Kelleher, MIT Press, 2015).

SUMMARY

Thus it can be seen that a selection of a machine learning algorithm to address a problem can be challenging in view of the numerous alternatives available, each with varying suitability. Furthermore, machine learning algorithms are tailored specifically for a task and implemented in a manner that tightly coupled algorithms to tasks. It would be beneficial to address these challenges in the state of the art to provide for more effective execution and arrangement of machine learning algorithms.

The present disclosure accordingly provides, in a first aspect, a computer implemented method of executing a software module comprising: a machine learning algorithm as an executable software component configurable to approximate a function relating a domain data set to a range data set; a data store; and a message handler as an executable software component arranged to receive input data and communicate output data for the module, wherein the message handler is adapted to determine domain parameters for the algorithm based on the input data and to generate the output data based on a result generated by the algorithm, the method comprising: generating a message as input data for the module, the message comprising instructions for execution by the module to effect a modification of the machine learning algorithm of the module.

In some embodiments the message includes a replacement machine learning algorithm and the instructions cause the replacement of the machine learning algorithm in the module with the replacement machine learning algorithm.

In some embodiments each module is a software object having functional methods and attributes.

In some embodiments each module in execution is serializable for communication of the module in a state of operation.

In some embodiments the network of modules is serializable based on serialization of each module in execution for communication of the network in a state of operation.

In some embodiments the input data includes an indication of a type of input data including one or more of: training data; and non-training data.

In some embodiments the input data includes training data including an indication of a state of one or more training examples as a positive training example or a negative training example.

In some embodiments the input data includes training data including an indication of a result associated with the training data.

In some embodiments the range data set includes one or more of: one or more classifications of data input to a machine learning algorithm; one or more clusters associated with data input to a machine learning algorithm; and one or more values of dependent variables for data input to a machine learning algorithm.

In some embodiments each of the modules is encrypted.

In some embodiments data communicated via the communications channel is encrypted.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 10 is a flowchart of a method of executing a plurality of machine learning modules in accordance with embodiments of the present disclosure.

FIG. 12 is a flowchart of an exemplary method of the broker of FIG. 11 in accordance with an embodiment of the present disclosure.

DETAILED DESCRIPTION OF THE DRAWINGS

Figure 1:
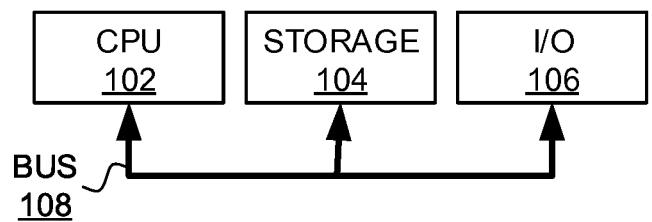
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
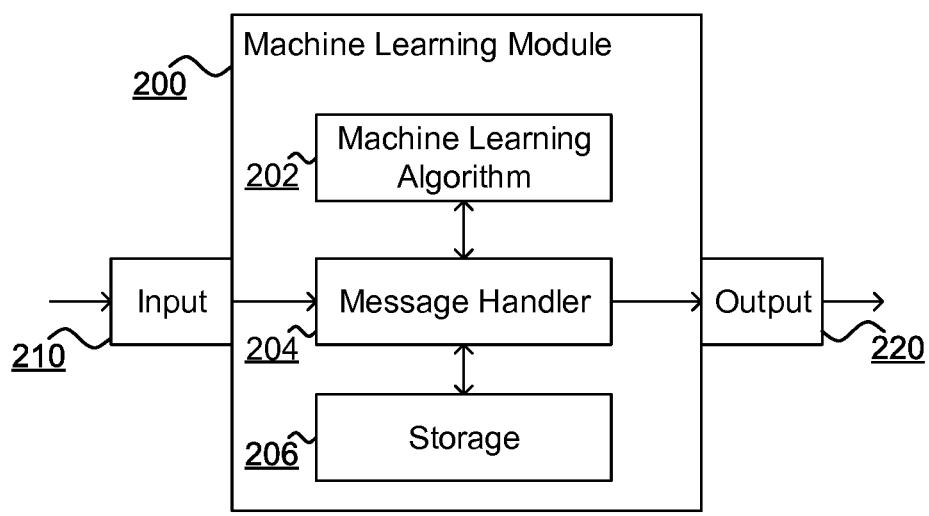
FIG. 2 is a component diagram of a machine learning module in accordance with embodiments of the present disclosure.

FIG. 2 is a component diagram of a machine learning module 200 in accordance with embodiments of the present disclosure. The machine learning module 200 is a discrete software module in that it is individual, separate and/or distinct and can be portable in the sense that the module 200 can be stored and/or transmitted for execution in potentially multiple execution environments such as physical or virtual computer systems or software platforms executing in a computer system such as runtime environments, operating systems, platform software and the like. The module 200 encapsulates functionality and data storage and can be implemented, for example, as an object or instantiable class in an object-oriented environment or as a software library having, in execution, access to a memory such as a memory heap. The machine learning module 200 includes an executable machine learning algorithm 202 such as any of the machine learning algorithms hereinbefore described or other suitable machine learning algorithms as will be apparent to those skilled in the art. Suitable machine learning algorithms are configurable to execute within the scope of the module 200 on the basis of input parameters including, for example, domain data and/or configuration parameters as an input for the algorithm 202 to generate a machine learning result such as range data and/or other output data. For example, the machine learning algorithm 202 can be provided as a method of a software object or a subroutine, procedure or function in a software library. Thus, the machine learning algorithm 202 is executable to perform machine learning functions including any or all of: a training phase of operation for training the algorithm 202 where the algorithm 202 is supervised or semi-supervised; and/or a processing phase of operation of the algorithm for providing one or more machine learning results.

In conjunction with the machine learning algorithm 202, and accessible to the algorithm 202, the module 200 further comprises a storage 206 as a data store for the storage of data by the algorithm 202. The storage 206 can be a volatile or non-volatile storage such as a memory, and is encapsulated by the machine learning module 200 either or both by a declaration, definition, specification or representation of the machine learning module 200 (such as a software class definition or serialized software component) or by a manner of execution of the module 200 at runtime such as by a memory heap or other memory structure suitable for allocation at runtime for constituting the storage 206 in association with the module 200.

Thus, the storage 206 is used, inter alia, by the algorithm 202 for the storage of data required by the algorithm such as machine learning parameters, machine learning results, machine learning data structures including representations of machine learning models such as, inter alia: tree data structures; representations of regression analysis data structures; representations of neural network data structures; variables; and any other data that may be stored by the machine learning algorithm 202 as will be apparent to those skilled in the art. Thus, in this way, the machine learning module 200 provides a discrete encapsulation of a machine learning algorithm 202 and data required for and by the algorithm 202 within a single module 200.

The machine learning module 200 further includes an interface for communication external to the module 200 that is the mechanism through which the algorithm 202 communicates with components and/or entities outside the module 200. The interface can be generalized as comprising an input interface 210 and an output interface 220 that can be defined and/or configured together. The input 210 provides a mechanism through which input data can be communicated to the machine learning module 200 including input for the algorithm 202. The output 220 provides a mechanism through which output data can be communicated by the machine learning module 200 including output for the algorithm 202. For example, machine learning parameters including configuration information, training data and machine learning input (domain) information can be communicated via the input 210 as at least part of input data. Further, for example, machine learning results such as output data can be communicated via the output 220 as at least part of output data.

The input data and output data communicated via the interface 210, 220 is structured and/or formatted irrespective of the nature of the machine learning algorithm 202 such that data of the same structure/format is communicated via the input 210 for each of multiple different algorithms implemented as the machine learning algorithm 202. Similarly, data of the same structure/format is communicated via the output 220 for each of multiple different algorithms implemented as the machine learning algorithm 202. Accordingly, the module 200 further includes a message handler 204 component has a software component for processing messages communicated via the interface 210, 220. The message handler 204 is adapted to determine machine learning parameters for the machine learning algorithm 202 from input data received via input 210. Similarly, the message handler 204 is adapted to define output data for communication via output 220 including machine learning results of the machine learning algorithm 202. Thus, the message handler 204 allows the provision of a common interface 210, 220 for potentially multiple modules including module 200, each having a machine learning algorithm 202, irrespective of a particular machine learning algorithm 202 employed in each module 200 from a set of heterogeneous algorithms. Notably, FIG. 2 illustrates the storage 206 also being accessible by the machine learning algorithm 202 via the message handler 204 such that all communication by and/or with the machine learning algorithm 202 is conducted via the message handler 204. Alternatively, the storage 206 can be directly accessed by the machine learning algorithm 202 such as a heap memory allocated for direct use by the algorithm 202. In some embodiments, the common interface 210, 220 is facilitated by a common message format such as a common data structure, protocol, message definition or the like, for communication via the input 210 and output 220. In one embodiment, such a common message format employs a semi-structured and/or self-describing data format such as extensible markup language (XML), JavaScript Object Notation (JSON), a hierarchical data format (HDF), common data format (CDF) or other formats including bespoke and/or proprietary formats as can be defined by, or will be apparent to, those skilled in the art. Principally, the common message format is required to represent machine learning parameters and machine learning results in a common manner (common between heterogeneous machine learning algorithms).

In one embodiment, a common message format is defined for input data as a common input message format and a common message format is defined for output data as a common output message format. Example 1 defines an exemplary common input message format including machine learning parameters using a semi-structured data format such as XML. The format definition for input messages according to the exemplary input message format of Example 1 is intended to be substantially comprehensive (save for extensions or simplifications as may be apparent to those skilled in the art) and individual elements of messages according to the input message format of Example 1 can be optional depending on the context of a particular input message. For example, the input message format of Example 1 includes a "training_data" section for defining training data fields where an input message relates to training data for a machine learning algorithm 202. Training data can include one or more training data items in a "data_set" section where each item can be listed in "item" elements or, alternatively, items could be provided as "item"/"type" tuples where each data item of training data is associated with a data type for the item such as a data format (e.g. numeric, textual, integer, real, double, Boolean, string, character, and the like). Such data items in a training data set constitute training examples taken from a domain x of the target function $f$ for approximation by the machine learning algorithm 202. Training data also has associated corresponding dependent data taken from the range y of the target function $f$ that learning algorithm 202 is trained to model. Thus, the training data set constitutes the independent variable x of the target function $f$ and the dependent data constitutes the dependent variable y. The dependent data associated with a training data set can include one or more of: a set of one or more items of dependent data as values of the dependent variable y, such as values of continuous variables that can be approximated by a regressive machine learning algorithm such as statistical regression algorithms; a set of one or more classifications or categorization a where the range of the dependent variable y is a classification scheme, such as may be approximated by a classifier machine learning algorithm; a set of one or more clusters u where the range of the dependent variable y is a clustering scheme, such as may be approximated by a clustering machine learning algorithm; and/or other dependent data relating to the range y of the target function $f$. In some embodiments, the training data section of the common input message format of Example 1 further includes an indication of whether the training example is a positive example or a negative example. Thus, a "positive_example" Boolean value can be provided for identifying a state of a training example as a positive or negative example. A positive training example is an example for which the indicated dependent data is properly associated with the domain data set x such that a machine learning algorithm 202 seeks to learn, reinforce or inform its model approximating the target function $f$ on the basis of the training example. A negative (or non-positive) training example is an example for which the indicated dependent data is not properly associated with the domain data set x such that a machine learning algorithm 202 seeks to learn, reinforce or inform its model approximating the target function $f$ on the basis of the negative training example.

Example 1: Common Input Message Format

```
<training_data>
    <data_set>
        <item>x₁</item>
        <item>x₂</item>
        <item>x₃</item>
        ...
        <item>xₙ</item>
    </data_set>
    <dependent_data>
        <item>y₁</item>
        ...
        <item>yₚ</item>
    </dependent_data>
    <dependent_classification>a</dependent_classification>
    <dependent_cluster>u</dependent_cluster>
    <positive_example>TRUE</positive_example>
</training_data>
<data_set>
    <item>x₁</item>
    <item>x₂</item>
    <item>x₃</item>
    ...
    <item>xₙ</item>
</data_set>
<attributes>
    <exclude>
        <item>m₁</item>
        ..
        <item>mᵣ</item>
    </exclude>
    <data_characteristics>
        <domain>d</domain>
        <range>r</range>
        <classifications>
            <item>a₁</item>
            ...
            <item>aₘ</item>
        </classifications>
        <clusters>
            <item>u₁</item>
            ...
            <item>u_q</item>
        </clusters)
    </data_characteristics>
</parameters>
```

Where a message according to the common input message format of Example 1 does not relate to or contain training data then the training data section can be empty or excluded altogether from the message. A message including data items as values of the independent variable x from the domain of a target function $f$ for processing by a machine learning algorithm 202 to predict or estimate values of dependent variable y can be provided in a separate "data_set" section of the common input message format of Example 1. Thus, such data items constitute machine learning input for the algorithm 202 on which basis output as values of dependent variable y are produced by the algorithm 202.

The common input message format of Example 1 further includes exemplary attributes for informing or otherwise configuring the operation of the machine learning algorithm 202. The attributes are purely illustrative and additional or alternative attributes will be apparent to those skilled in the art. For example, an "exclude" attribute can list one or more machine learning algorithms or classes/types of machine learning algorithm to exclude from processing the message. For example, a message comprising training data is not appropriate and should not be processed by an unsupervised machine learning algorithm. Similarly, some algorithms may be selected for exclusion from modeling a particular target function $f$ on the basis of an assessment of suitability for modeling, such as where a target function $f$ relates purely to a classification scheme and machine learning algorithms determined to be unsuitable for classification can be excluded from modeling such a target function. In one embodiment, a standardized dictionary, ontology or reference model for identifying machine learning algorithms or classes/types of machine learning algorithm is provided such that excluded algorithms or classes/types of algorithm can be defined in a common manner in the common input message format.

Additionally, the common input message format of Example 1 includes a "data_characteristics" section in which characteristics of the independent and/or dependent variables x, y can be defined to inform the operation of a machine learning algorithm 202. For example, such characteristics can include some definition of the range of dependent variable y, such as a definition of valid values of y by way of, for example, data types of y, data formats of y, enumerations of valid values of y, bounds of y, granularity or precision of y, and other definitions of characteristics of the range as will be apparent to those skilled in the art. Other characteristics can include: an enumeration, definition or specification of one or more classes of y such as classes $a_1$ to $a_m$; and/or an enumeration, definition or specification or one or more clusters of y such as clusters $u_1$ to $u_q$.

While the common input message format of Example 1 has been described for single training examples and/or single sets of data items as values of the independent variable x, it will be appreciated by those skilled in the art that the format of Example 1 could equally be adapted to supply multiple training examples or sets of data items in a single message. For example, the message format can be adapted to permit lists of training examples and the like.

Example 2 defines an exemplary common output message format including a machine learning result using a semi-structured data format such as XML. The format definition for output messages according to the exemplary output message format of Example 2 includes a "learning_result" section including one or more data items $y_1$ to $y_s$ constituting the output of a machine learning process based on inputs for the target function $f$ It will be appreciated by those skilled in the art that provision can be readily added for additional information in the exemplary common output message format.

Example 2: Common Output Message Format

```
<learning_result>
    <item>y₁</item>
    ...
    <item>yₛ</item>
</learning_result>
```

Alternatively or additionally, a common universal message format can be defined for both input data and output data in a single message format. Example 3 defines an exemplary common universal message format including using a semi-structured data format such as XML. The universal message format of Example 3 is suitable for including both machine learning parameters and machine learning result(s) within a single message format. The universal message format of Example 3 includes a "data_set" section of data items which, in the exemplary arrangement, each have associated a data type t and value v tuple. Thus, the data set is suitable for storing data items as any or all of: a training example; values of dependent variable y for a training example; and values of the independent variable x from the domain of a target function $f$ for processing by a machine learning algorithm 202 to predict or estimate values of dependent variable y. Thus, the data set of the exemplary common universal message format is adaptable based on context. The common universal message format of Example 3 further includes an "attributes" section including many of the features described above with respect to Example 1. A universal message format such as that described in Example 3 is especially advantageous since both input and output messages to the machine learning module 200 are defined by a common universal format definition permitting conceivably the output of the machine learning module 200 to constitute the input of another machine learning module. While the common universal message format of Example 3 has been described for data sets it will be appreciated by those skilled in the art that the format of Example 3 could equally be adapted to supply multiple sets of data items in a single message. For example, the message format can be adapted to permit lists of training examples and the like.

Example 3: Common Universal Message Format

```
<data_set>
    <data_item>
        <data_type>t₁</type><value>v₁</value>
        <data_type>t₂</type><value>v₂</value>
        ...
        <data_type>tₙ</type><value>vₙ</value>
    </data_item>
</data_item>
<attributes>
    <training_data>
        <training_flag>BOOL</training_flag>
        <dependent_data>
            <item>y₁</item>
            ...
            <item>yₚ</item>
        </dependent_data>
        <dependent_classification>a</dependent_classification>
        <dependent_cluster>u</dependent_cluster>
            <positive_example>TRUE</positive_example>
    </training_data>
    <exclude>
        <item>m₁</item>
        ..
        <item>mᵣ</item>
    </exclude>
    <data_characteristics>
```

Example 3: Common Universal Message Format

```
        <domain>d</domain>
        <range>r</range>
        <classifications>
            <item>a₁</item>
            ...
            <item>aₘ</item>
        </classifications>
        <clusters>
            <item>u₁</item>
            ...
            <item>u_q</item>
        </clusters>
    </data_characteristics>
</attributes>
```

Figure 3:
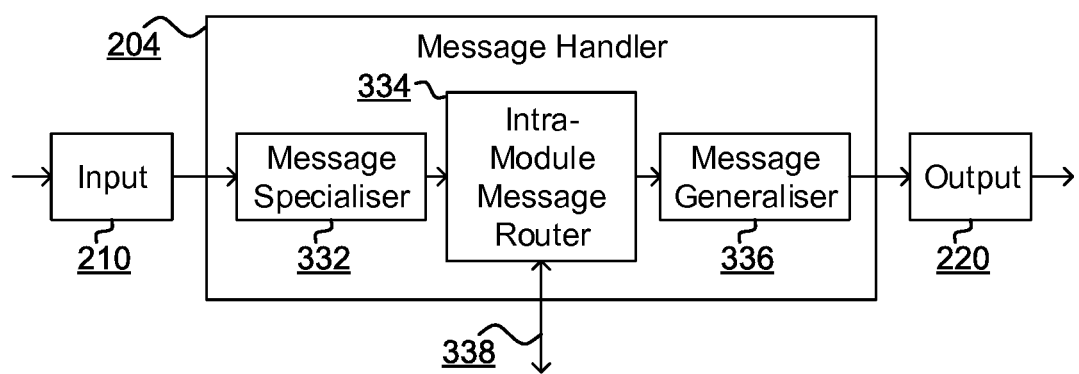
FIG. 3 is a component diagram of the message handler of FIG. 2 in accordance with embodiments of the present disclosure.

FIG. 3 is a component diagram of the message handler 204 of FIG. 2 in accordance with embodiments of the present disclosure. The message handler 204 of FIG. 2 is purely exemplary and includes a message specializer 332, intra-module message router 338 and a message generalized 336. The message specializer 332 is a software component for determining machine learning parameters for a machine learning algorithm 202 based on one or more messages in a common message format. Such determination can be made by conversion, extraction, interpretation or other process as will be apparent to those skilled in the art. The machine learning parameters will be provided to the machine learning algorithm 202 in a format or arrangement required by, specific to and/or defined by the machine learning algorithm 202. For example, the machine learning parameters can be provided as arguments to an execution of the machine learning algorithm 202, such as a function, procedure, method or subroutine call of the algorithm 202. Alternatively, the machine learning parameters can be stored in the storage 206 for access by the machine learning algorithm 202 in execution. Other mechanisms for making the machine learning parameters available to the algorithm 202 will be apparent to those skilled in the art. Thus, the message specializer 332 can be considered a mechanism for taking the common message format of messages received via input 210 and converting them or interpreting them for provision to the machine learning algorithm 202. Similarly, the message generalizer 336 takes machine learning result(s) from the algorithm 202 and generates, formulates, prepares or populates output messages in a common message format for communication by the module 200 via the output 220. For example, the message generalizer 336 can generate a new output message in a common message format populated with machine learning output data items.

The intra-module message router 334 is an optional component for providing routing of messages (where in a common message format or messages specific to the machine learning algorithm 202, the storage 206, the message handler 204 or a controller such as will be described with reference to FIG. 9) between components within the machine learning module 200 and, optionally, a controller such as will be described with reference to FIG. 9. For example, the intra-module message router 334 can communicate with each of the machine learning algorithm 202 and the storage 206 via a communication mechanism 338 internal to the machine learning module 200. The communication mechanism 338 can include one or more of: a defined data interface employing a data protocol; an inter-process communication (IPC) mechanism; message passing; data sharing; direct memory access; a communications network;

procedure/function/subroutine calling; or other communications mechanisms as will be apparent to those skilled in the art.

Thus, in use, the message handler 204 is adapted to determine the machine learning parameters for the algorithm 202 based on the input data received in a common message format at input 210 and to generate output data in a common message format for the output 220 based on the machine learning result. The encoding, storage or otherwise provision of the machine learning parameters and machine learning result in common message formats thus provides a decoupling between the data and the machine learning algorithm 202 by way of the interfaces 210, 220 and the message handler 204. This decoupling advantageously provides for an abstraction between any particular machine learning algorithm implementation and data required for and by the machine learning algorithm such as data provided by an invoker, algorithm trainer, host application or other component employing the machine learning algorithm. In this way, the machine learning module 200 becomes a pluggable component of a solution employing machine learning functionality that may be replaced, adapted, upgraded, added or removed.

Figure 4:
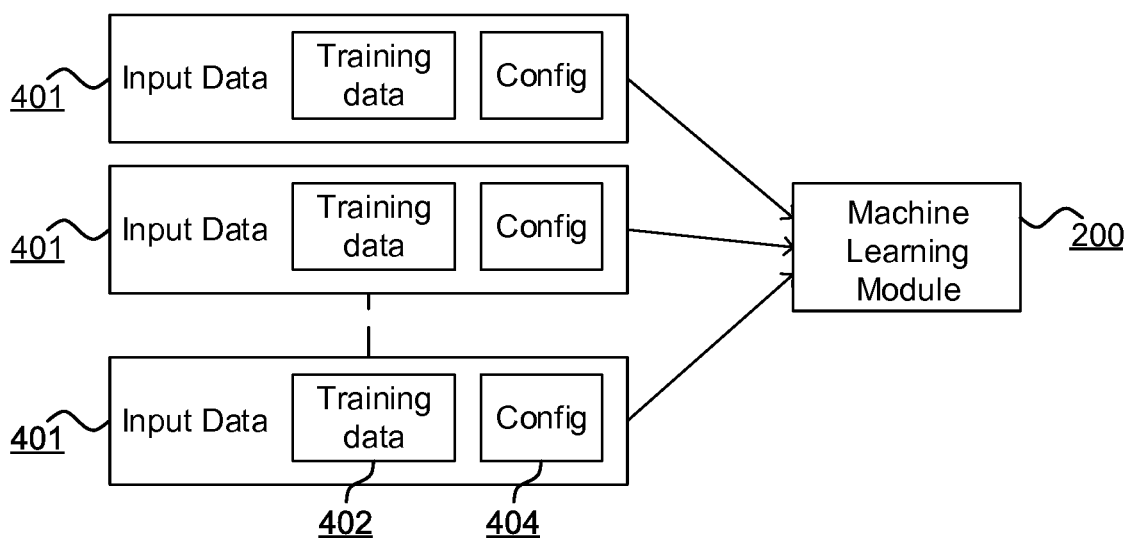
FIG. 4 illustrates a process of training a machine learning algorithm of the machine learning module of FIG. 1 in accordance with embodiments of the present disclosure.

FIG. 4 illustrates a process of training a machine learning algorithm 202 of the machine learning module 200 of FIG. 1 in accordance with embodiments of the present disclosure. In the arrangement of FIG. 4 a machine learning module 200 includes a supervised machine learning algorithm requiring training. One or more input messages 401 are initially provided via an input interface 210 of the module 200. Each input message 401 includes training data 402 and, optionally, some configuration information 404 such as attributes as previously described. For example, the input messages 401 are messages according to the common input message format of Example 1 or the common universal message format of Example 3. The input messages 401 serve to train the machine learning algorithm of the module 200.

Figure 5:
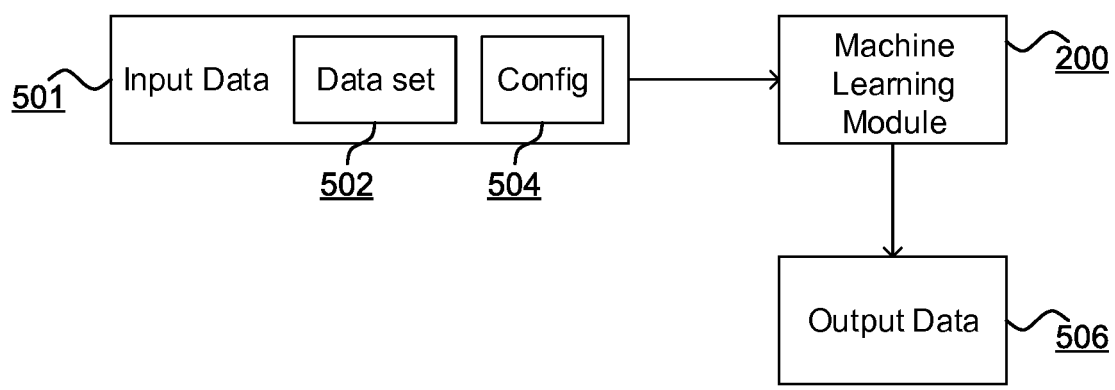
FIG. 5 illustrates a process of invoking the machine learning algorithm of the machine learning module of FIG. 1 in accordance with embodiments of the present disclosure.

FIG. 5 illustrates a process of invoking the machine learning algorithm 202 of the machine learning module 200 of FIG. 1 in accordance with embodiments of the present disclosure. An input message 401 is provided via the input interface 210 of the module 200 so as to cause a machine learning algorithm 202 of the module 200 to generate a machine learning result that is communicated by the module 200 as an output message 506. In some embodiments, the output message 506 is a message according to the common output message format of Example 2 or the common universal message format of Example 3. Thus, the machine learning module 200 is trained and invoked by the messages illustrated in FIGS. 4 and 5.

Figure 6:
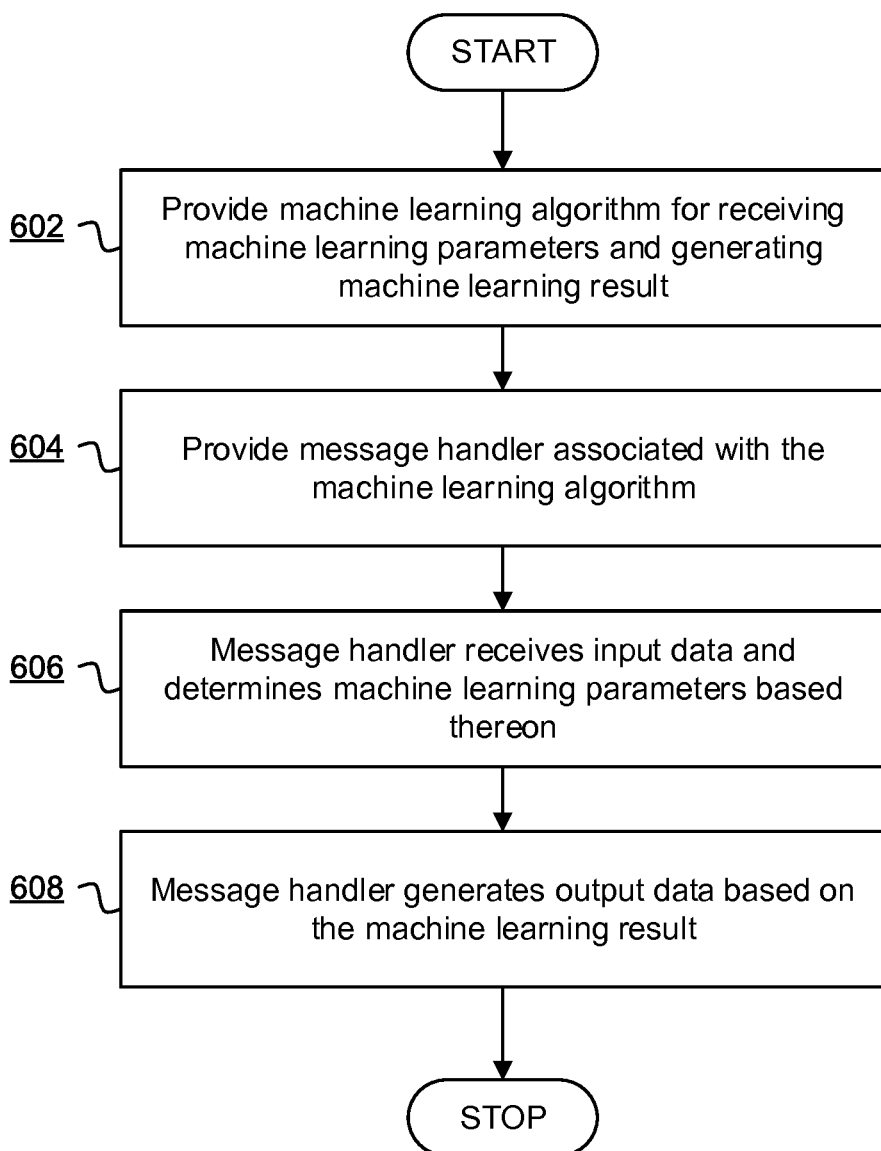
FIG. 6 is a flowchart of a method of executing a machine learning algorithm in accordance with embodiments of the present disclosure.

FIG. 6 is a flowchart of a method of executing a machine learning algorithm 202 in accordance with embodiments of the present disclosure. Initially, at 602, a machine learning algorithm 202 is provided for receiving machine learning parameters and generating machine learning result(s). Subsequently, at 604, a message handler 204 is provided associated with the machine learning algorithm 202. In some embodiments, the machine learning algorithm 202 and the message handler 204 are provided encapsulated, contained within or as part of a machine learning module 200. At 606, the message handler 204 receives input data via an input interface 210 and determines the machine learning parameters based on the input data. At 608, the message handler 204 generates output data for communication via the output interface 220, the output data being generated based on the machine learning result.

In one embodiment, the message handler 204 is adapted to process potentially multiple input messages via the input interface 210 for combining to generate one or more machine learning parameter sets for the algorithm 202. Such multiple input messages can be formatted according to a common format such as those described above with respect to Example 1 or Example 3. The message handler 204 can be configured to generate one or more machine learning parameter sets for the machine learning algorithm 202 based on such multiple messages. For example, multiple messages may be received each including training data for a supervised machine learning algorithm 202 and the message handler 204 can generate machine learning parameters for each. In this way, input messages arriving from potentially disparate origin (e.g. different source applications or potentially multiple other machine learning modules) can be processed by the machine learning algorithm 202.

In one embodiment, the module 200 is serializable such that the module in execution can be converted to a serialized version that is readily communicated such as via a computer network. Serialization of software components such as objects in object oriented computing environments is well known in the art and provides for the portability of a module in execution with its state of operation such as a content of the storage 206.

In one embodiment, the machine learning module 202 is encrypted such as an encrypted software object so as to mitigate tampering, malicious interference with or modification of the module 202.

Figure 7:
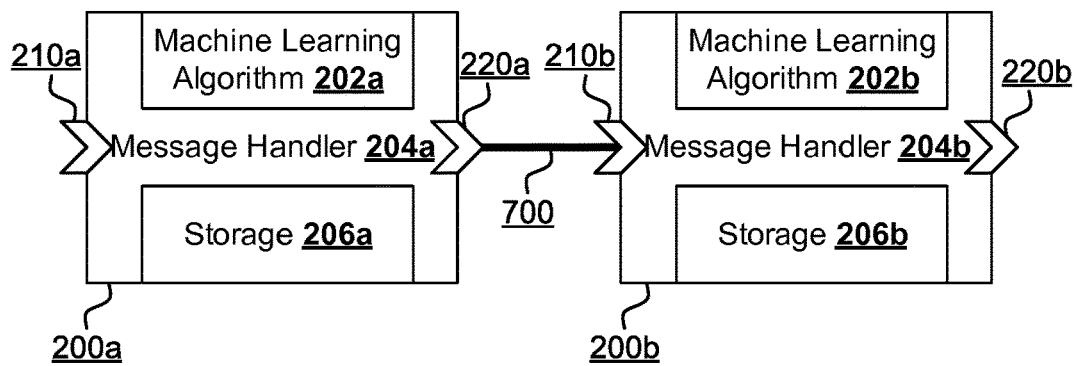
FIG. 7 depicts an arrangement of multiple machine learning modules communicatively connected by a communication channel in accordance with embodiments of the present disclosure.

FIG. 7 depicts an arrangement of multiple machine learning modules 200a, 200b communicatively connected by a communication channel 700 in accordance with embodiments of the present disclosure. Each of the machine learning modules 200a and 200b is arranged substantially in accordance with the description of modules provided hereinbefore. Notably, the machine learning algorithms 202a and 202b can be different including potentially different classes, types or arrangement of machine learning algorithm (such as one supervised and one unsupervised algorithm). Similarly, the storage 206a and 206b are separate and each module has its own separate message handler 204a, 204b. Thus, each of the modules 200a, 200b is treated as a discrete and separate entity that could, conceivably, be modified, replaced, changed or removed independent of the other.

The arrangement of FIG. 7 further includes a communication channel 700 between the modules 200a, 200b of communication of output of a first module 200a communicated via an output interface 220a to an input of a second module 200b communicated via an input interface 210b. The communication channel 700 can be any suitable mechanism for providing communication between the modules 200a, 200b such as, inter alia: a wired or wireless computer network; IPC; message queuing schemes; shared data using, for example, data/file locks or other synchronization mechanisms such as mutexes or condition variables; sockets; signals; or semaphores. Other communication mechanisms suitable for implementation of the communication channel 700 will be apparent to those skilled in the art.

The communication channel 700 thus provides communication of messages between modules 200a, 200b and, in some embodiments, between components external to the machine learning modules 200 such as software components executing with the machine learning modules 200. Thus, for example, a software application requiring use of machine learning modules 200 can communicate therewith via the communication channel 700. Notably, the nature of common message format definitions and the techniques of the message handler 204 of each module 200 provides that at least part of the output data from a first module can be used to constitute at least part of input data for a second module. Thus, in one embodiment, the output of module 200a can be wholly or partly communicated to module 200b for use as input in module 200b. Further, the message handler of module 200b may extract only part of the input data received in a common message format at the input interface 210b of module 200b by selective extraction according to the needs of the machine learning algorithm 202b of module 200b.

Figure 8:
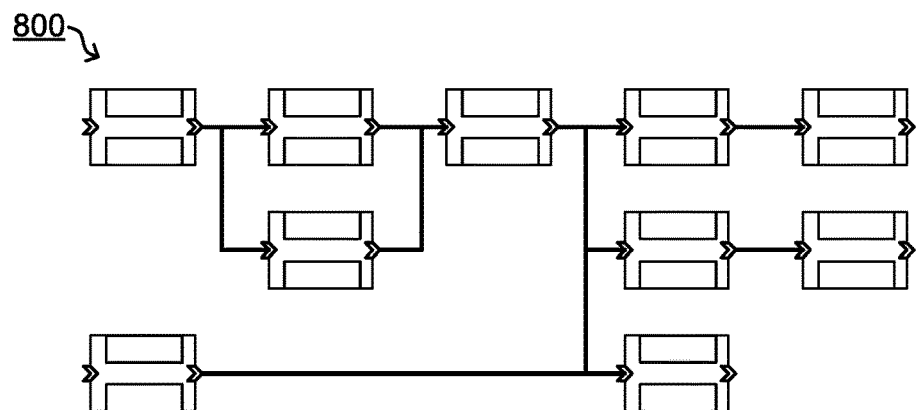
FIG. 8 illustrates a network of machine learning modules in accordance with embodiments of the present disclosure.

FIG. 8 illustrates a network 800 of machine learning modules in accordance with embodiments of the present disclosure. The communication channel 700 described above with respect to FIG. 7 can thus be used to provide the network 800 of multiple machine learning modules 200 arranged such that at least part of output of some modules constitute at least part of input of other modules. The network 800 of modules 200 can be a directed graph of machine learning modules 200 having one or more start points (entrances to the graph) and one or more end points (exits from the graph). At the edges of the graph (and, in some embodiments, conceivably within the graph itself) whole network 800 inputs and outputs can be communicated.

For example, where a network 800 of machine learning modules 200 provides a machine learning service for a software application, the application can communicate inputs (such as training and machine learning input data) via an input interface of the network 800 directly corresponding to the input interfaces of one or more designated input modules, and can receive outputs (such as machine learning results) via an output interface of the network 800 directly corresponding to the output interfaces of one or more designated output modules in the network 800.

The ability to network machine learning modules in this way provides the opportunity for discrete machine learning algorithms to operate on all, part or combinations of data output from other machine learning algorithms so providing for a refinement of the machine learning process. That is to say, the model of target function $f$ of any particular machine learning algorithm can be realized by one or more networks 800 of machine learning modules 200 such that the function $f$ is subdivided into sub-functions $f_1 \ldots f_a$ each of which can be organized and interconnected according to a functional decomposition of $f$. In traditional functional decomposition, a known function is broken down into a plurality of sub-functions each of which can be combined to realize the overall function. Embodiments of the present disclosure contemplate the applicability of this principle to the process of approximating a target function $f$ by modeling sub-functions $f_1 \ldots f_a$ of the target function in order to build-up a model of the target function $f$. Notably, the interconnections between the sub-functions $f_1 \ldots f_a$ (each corresponding to a module in the network 800) in a functional decomposition for a target function $f$ are not known beforehand and thus may require adaptation as machine learning processes proceed. Control of these interconnections can itself be handled by a controller 900 such as a software controller for monitoring an effectiveness of a network 800 of machine learning modules and adapting the network 800 by reconfiguring channels between the modules.

In one embodiment, every module in the network 800 is serializable such that the entire network can be serialized by conversion to a serialized version that is readily communicated such as via a computer network. In one embodiment, the machine learning modules are encrypted such that the entire network 800 is encrypted. Further, in one embodiment, communication via the communication channel 700 is encrypted.

Figure 9:
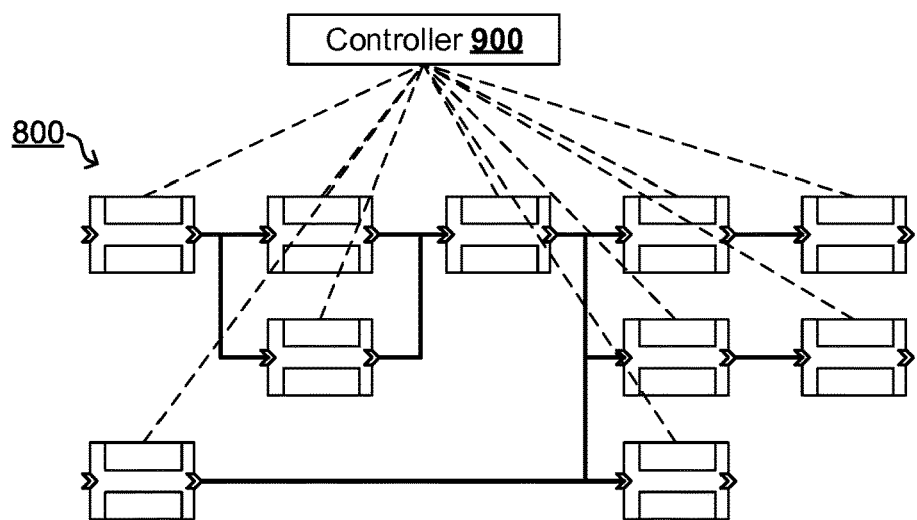
FIG. 9 illustrates a network of machine learning modules in accordance with alternative embodiments of the present disclosure.

FIG. 9 illustrates a network 800 of machine learning modules in accordance with alternative embodiments of the present disclosure. In FIG. 9 the controller 900 is communicatively connected to each of the modules in the network 800. In one embodiment, the controller 900 is arranged to adapt the communication channels between modules in the network in response to the output of the network 800 and an assessment, by the controller 900, of an effectiveness of the network 800 in modeling the target function $f$. Such an effectiveness can be determined, for example, on the basis of a supervised training mechanism by which training data known to the controller 900 that has not been shared with the modules in the network 800 is used to measure the accuracy of an approximation to the target function $f$ offered by the network 800 as a model of $f$. Adaptation of communication channels can include: removing connections between modules; introducing connections between modules; strengthening connections between modules; and weakening connections between modules. Where connection strength is referred to, it can include, for example, an amount or proportion of data that is to be communicated, received, taken into account or used via a communication channel between modules or a weight that is to be applied to data communicated via a particular communication channel.

In one embodiment, the network 800 of modules is itself treated as a data structure of machine learning elements in which each module is an element of an overall machine learning algorithm applied across all modules in a network. For example, the network 800 of modules can be organized as a neural network with relationships between modules being interconnections between neurons and modules constituting neurons. Threshold weights for modules can be imposed by the controller 900 by affecting the communication channels between modules.

FIG. 10 is a flowchart of a method of executing a plurality of machine learning modules 200 in accordance with embodiments of the present disclosure. Initially, at 1002, software modules are provided, each having a machine learning algorithm, data store and a message handler substantially as hereinbefore described. Subsequently, at 1004, a communication channel is provided between modules to permit at least part of an output of a first module to constitute at least a part of an input of a second module.

In some embodiments, multiple such networks 800 can be provided for interoperation therebetween such that networks 800 of machine learning modules themselves become pluggable, replaceable, modifiable without a need to modify other software or networks 800 interfacing therewith. Thus, a plurality of networks of discrete software modules as previously described can be provided such that an output from one or more modules in a network constitutes an output of the network and an input to one or more modules in the network constitutes an input of the network. In such an arrangement, a communication channel can be provided between each network of modules in order that at least part of an output for a first network constitutes at least part of an input for a second network so as to provide cooperation between the networks of modules to further refine an approximation of a target function $f$.

The execution of machine learning algorithms can be resource intensive, depending on the algorithm used. Specially configured hardware arrangements can be employed for complex, high volume or mathematically intensive algorithms such as the use of high performance processors tailored to undertake specific mathematical operations. Graphics processing units are often considered particularly suitable. In spite of improvements that can be made to hardware and software configuration of machine learning algorithms, any network of machine learning algorithms such as the arrangement of FIG. 9 can lead to modules of the network 800 collectively consuming considerable volumes of computing resource such as processor, storage and network resource. Advantageously, such consumption is managed proactively and in a verifiable manner. It is essential that the management of resource does not require active participation and/or cooperation of any one machine learning module 200 because the origin, provenance and/or source of the module may not be within the control of a consuming application and such modules need not be configured with tight coupling to any particular implementation in mind. Thus it is necessary to approach resource management in a novel manner.

Figure 11:
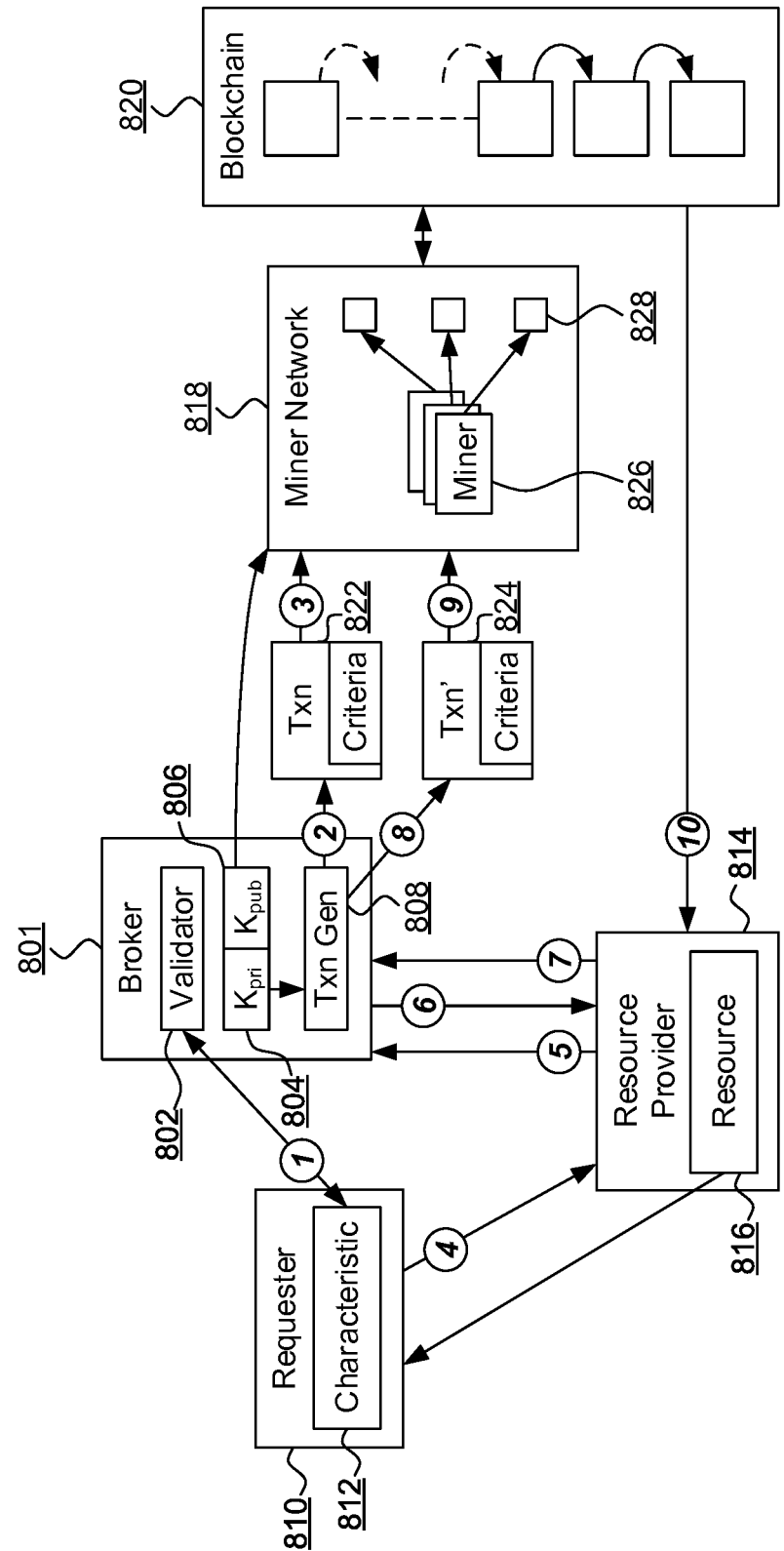
FIG. 11 is a component diagram of an exemplary computer system arrangement in which a requester requests access to a resource provided by a resource provider in accordance with an embodiment of the present disclosure.

Computing resources such as storage, processors, security functions, communication resources such as networking and the like are increasingly provided by "supplier" entities (whether third-party or not) either as literal resources or virtualized resources. The consumption of such resources is increasingly dynamic, on-demand and/or dynamically scalable. Resource providers and consumers (such as machine learning modules) in such environments can be unrelated, anonymous, untrusted and/or unknown to each other. A challenge arises for a resource provider in determining whether and when to grant access to restricted or constrained resources requested by such consumers that can be considered untrusted. In particular, it is necessary for the resource provider to determine whether a particular consumer is identifiable as a consumer that can be irrefutably confirmed to be authorized or entitled to access a resource. This problem is especially acute where there is no relationship between consumers and providers such that the identities of authorized consumers are not known, and there is no commonly agreed authority (such as a centralized service) that can confirm identity or authorization to consume resources. For example, computing environments can be adapted to spawn new and potentially transient consuming entities such as software applications, components and/or agents whose existence cannot be known about and whose existence may be short-lived. Traditional access control is ineffective in such environments. Even where consuming entities purport to relate to a particular identity, or purport to have a particular authorization or authentication, problems exist in confirming such relationship or authorization without recourse to an "all-knowing" centralized server or set of servers. Implementing such a centralized system is itself problematic since a number and disparity of resource providers and consumers required can be enormous and any centralized coordination function can require an untenable degree of scalability and resource. FIG. 11 is a component diagram of an exemplary computer system arrangement in which a requester 810, such as a machine learning module 200 requiring access to computing resource, requests access to a resource 816 provided by a resource provider 814 in accordance with an embodiment of the present disclosure.

A requester component 810 is a software, hardware, firmware or combination computing system such as a software application, client, computer terminal application, service requester, enterprise software, virtual or physical machine and alternatives as will be apparent to those skilled in the art. The requester has associated one or more characteristics such as characteristic 812. The characteristic 812 is a feature, aspect, attribute, configuration, quality, faculty, endowment, property, style, membership, classification, value or other characteristic that is or may be relevant to a determination of whether the requester 810 can be or is authorized to access a resource 816. For example, the characteristic 812 can include, inter alia: an identity, identifier, distinctiveness, inclusion or ownership (either owned by or owning), credential or the like; a location whether geographic, within a network, co-location with a resource provider, resource or other entity, or within a virtualized computing environment; an existing or potential facility, service, capability, function or compatibility of or associated with the requester 810 such as a particular technical compatibility including software versioning, library availability, protocol support, encryption standard, security protocol and the like; a degree or level of security provided with, by or available from the requester 810; a level of trust attributed to, judged for, indicated for or determined for the requester 810; a particular system, organizational or other affiliation of the requester; and other characteristics as will be apparent to those skilled in the art. The characteristic 812 can be communicated by the requester 810 via a network such as the communication mechanism 700 between machine learning modules 200 in a network 800 of modules or in communication with a controller 900.

The requester 810 is a consumer of computing resources available from resource providers such as resource 816 available from resource provider 814. Resource provider 214 is a software, hardware, firmware or combination computing component, including virtual or virtualized computing components such as a virtualized machine, having associated one or more resources such as resource 816 and making the resource 816 available to requesters such as requester 810 where such requesters are authorized or entitled to consume the resource 816 as determined in accordance with embodiments of the present disclosure herein described. For example, the resource provider 814 is a server or service provider computer system offering resources for consumption on-demand, as-required, dynamically or as a service. In one embodiment, the resource provider is a cloud computing service provider. The requester 810 and resource provider 816 are directly or indirectly communicably connected such as by way of a computer network such as a wired or wireless network including a local area network, a wide area network, the internet and alternatives as will be apparent to those skilled in the art.

The resource 816 can be any conceivable computing resource consumable by the requester 810 whether by delivery to the requester 810, such as via a communications mechanism linking the requester 810 to the resource provider 814, or by way of consumption of the resource 816 while the resource remains at, with or under the control of the resource provider 814 or some other computer system, virtual machine or environment provided with, in association with or communicatively connected to the resource provider 814, such as a cloud computing resource. For example, the resource 816 can include: storage resources such as virtual or physical storage, memory, disk storage, database storage and the like; processing resource such as a physical or virtual processing system(s) or processor(s), whether co-located or distributed; application resources such as database resources, middleware services, message handling applications or services, transaction processing applications or services, user interface facilities; security facilities such as encryption, monitoring, detection, scanning, proxy, firewall, intrusion detection services and the like; services or applications provided by way of an application programming interface, remote procedure call, remote method invocation, subroutine invocation or other software interface, such as mathematical functions, application specific functions or procedures, object oriented class libraries and/or their implementations such as instantiated objects in execution or synchronized for transfer and the like; media processing functions and/or procedures such as audio, video and multimedia processing functions; communications services, facilities, bandwidth, software, hardware and the like such as access to dedicated or shared communications lines, connections or bandwidth, intermediate network nodes such as routers, switches and proxies, networking services such as physical or virtual network communication, address or name resolution services, gateway services, access point facilities such as wired or wireless network access points, cellular telecommunications services and/or facilities and the like; and any other computing resources useable by the requester 810 and available by a resource provider 814 as will be apparent to those skilled in the art.

The arrangement of FIG. 11 further includes a broker 801 as a software, hardware, firmware or combination component adapted to validate the characteristic 812 of the requester 810 to determine if the requester 810 is, or should be, authorized or eligible to request consumption of resources, whether generic resources, specific resources or resources of a particular class or resource. In this regard, the broker 801 includes a validator processing unit 802 as a software, hardware, firmware or combination component adapted to undertake the validation of the characteristic 812 of the requester. Notably the validation by the broker 801 can be independent of any particular resource or class of resource, or can be specific to a particular resource or class of resource whether associated with the broker 801 or requester 810 or identified by the requester 810. Example such validations, by way of example only, include:

- the validator 802 being adapted to determine if the requester 810 is capable of supporting security facilities including encryption using a particular encryption algorithm and/or standard as indicated by the characteristic 812, with a positive determination validating the compatibility of the requester 810 such that the requester 810 is validated as being suitable for, authorized or entitled to consume particular or class(es) of resource requiring such security characteristics;
- the validator 802 being adapted to determine if the requester 810 is associated with one or more particular identities (or classes of identity) with reference to an identity authentication service, such particular identities being predetermined to be authorized or entitled to consume;
- the validator 802 being adapted to determine if the requester 810 satisfies a pre-requisite proof of work requirement, such as the completion of a particular challenge, task, algorithmic procedure with a verifiable output that verifiably confirms work has been done, such as hashing operations to satisfy particular hash characteristics;
- the validator 802 being adapted to validate, confirm or verify an exchange of resource has taken place, such exchange directly or indirectly producing an entitlement or authorization of the requester 810 to consume a particular, or particular class of, resource;
- the validator 802 being adapted to validate a signature, hash or encrypted object associated with, provided by or constituting the requester 810 or characteristic 812 such as by reference to a public key from a public/private key pair;
- the validator 802 being adapted to confirm that the requester 810 exists in, relates to, operates in or is associated with a particular location or class of location(s) such as a geographic, network, system or other location; and/or
- the validator 802 being adapted to confirm that the requester 810 exists as a discrete, separate, unique and individual entity or group of entities and such as, for example, to confirm that the requester 810 is not a spoof, proxy, intermediary, façade, surrogate or illegitimate entity.

It will be appreciated by those skilled in the art that these examples are not exhaustive and any feature, attribute, capability, identity or other aspect of any characteristic 812 of the requester 810 can form the basis of a validation process undertaken by the validator 802. Further, it will be appreciated that the validator 802 may draw on the services of other internal or external services, components and/or systems to undertake its validation.

The broker 801 further includes a transaction generator 808 as a software, hardware, firmware or combination component adapted to generate transaction data structures representing a validation of the characteristic 812 of the requester 810. Such validation can represent the potential for the requester 810 to consume a resource. The representation of a validation of the characteristic 812 may be characterized by a class, type, category of resource so authorized or alternatively may be devoid of any particular resource indication. In addition to representing the validation of the characteristic 812, each transaction generated by the broker 801 defines criteria for determining whether the requester 810 is authorized or entitled to consume a resource. The determination is contextual in that the determination can only be made when a particular resource, such as resource 816, is considered, proposed or requested for consumption by the requester 810 such that the criteria can be tested. That is to say, a transaction does not necessarily define that a particular resource is authorized for consumption by a particular requester 810. Rather the transaction per se represents validation of the characteristic 812 and defines criteria that, if satisfied, serve to determine that resource consumption is authorized or entitled. Thus, an initial transaction 822 is generated by the broker 801 corresponding to the validation of the characteristic 812 of the requester 810. The initial transaction is signed by the broker 801 such as by encryption using a private key 804 from a public key/private key pair. The transaction can thus be confirmed to originate from the broker 801 by any other entity with reference to a public key 806 corresponding to the private key 804.

The criteria of the initial transaction 822 can be any criteria the satisfaction of which serves to verify authorization or entitlement to consume a resource. For example, the criteria can be criteria associated with attributes, characteristics, functions or behaviors of, inter alia: the requester 810; the resource provider 814; the resource 816 itself; services, facilities or resources involved in the prospective resource consumption such as additional, incidental, implied or supplementary resources; the context of the prospective consumption such as a time, location, duration, rate, timeliness or priority (absolute or relative) of the consumption of the resource 816; reference to one or more third parties the authorization of which is required; further checks, verification or validation of the characteristic 812 of the requester 810; or any other features of the resource 816, requester 810, characteristic 812, resource provider 814 or other resources or facilities associated therewith. For example, the transaction can define:

- a requirement that the resource 816 satisfies a particular security standard such as a standard of encryption;
- a requirement that the resource provider 814 provides the resource 816 with a particular level of performance, such as particular speed, throughput, accuracy and the like;
- a requirement that the requester 810 consumes the resource 816 to a threshold extent such as up to a maximum extent or above a minimum extent, for example a maximum amount of storage in a data storage resource, a minimum network data rate in a communication resource, consuming the resource 816 for a maximum amount of time, requesting consumption of the resource with a particular degree of timeliness, and the like; and/or
- a requirement that the requester 810 consumes the resource 816 only to a maximum extent corresponding to an extent of exchange of resource by the requester 810, for example where the requester 810 provides resources such as computing resources in exchange for resources of the resource provider 814 the extent of consumption of the resource provider's resources is limited to the extent of provision of the requester's resources.
- the validator 802 being adapted to validate, confirm or verify an exchange of resource has taken place, such exchange directly or indirectly producing an entitlement or authorization of the requester 810 to consume a particular, or particular class of, resource;

It will be appreciated that any suitable criteria for determining authorization or entitlement to consume the resource 816 can be defined by transactions generated by the broker 801. Further, a transaction can define criteria with no indication of a particular resource for consumption. Where there is no such resource indication, a resource provider 814 can be operable to subjectively interpret any indication of a state of authorization encoded in a transaction in the context of the resource provider 814 to determine a state of authorization in context for the provider 814.

In one embodiment, the criteria include an authorized extent of consumption of the resource 816 such that consumption by the requester 810 serves to deplete the authorized extent of consumption. Accordingly, consumption by the requester 810 and depletion of an authorized extent of consumption are indicated by one or more additional transactions 824 occurring subsequent to the initial transaction 822. A subsequent transaction 824 includes criteria reflecting any depletion in an extent of authorized consumption. For example, where an initial transaction 822 defines criteria requiring an extent of consumption of a resource up to a maximum extent and some portion of that extent is consumed by the requester 810, a subsequent transaction 824 will define criteria reflecting the extent of consumption by, for example a different maximum extent corresponding to the remaining extent after existing consumption. Thus, where an extent of consumption of a resource is defined to be limited to one hour of time in an initial transaction and the requester consumes 30 minutes, a subsequent transaction can represent a remaining extent limited to 30 minutes (the balance of the unconsumed extent). Thus, transactions generated by the broker 801 form the basis of sharing, validating and accounting the requester's 810 authorization to consume resources in a manner that serves to assure verifiable authorization to consume and precludes repudiation of consumption. Accordingly, a validation of a characteristic 812 of the requester 810 and any resource (or class of resource) consumption criteria are encoded in transactions generated by the broker 801.

Transaction generator 808 can generate an initial transaction 822 at the request of the requester 810 and subsequent transactions 824 for each consumption of the resource 816. Thus, the transactions 822, 824 form a transaction sequence mapping the consumption by the requester 810 of resources. To provide reliability and certainty for the resource provider 814 that all transactions are valid, up-to-date and that there is no repudiation of transactions occurring from false-accounting and the like, all transactions must be verified both in themselves (i.e. their origin and authenticity) and as a sequence of transactions (i.e. that no transaction is repudiated, deleted, reused, undone etc.) To achieve this, embodiments of the present disclosure employ a distributed sequential transactional database, hereinafter a blockchain 820, with a network 818 of miner entities 826 to validate all transactions in a reliable and verifiable manner.

Distributed sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, such a database is herein referred to as a blockchain 820 though it will be appreciated that other suitable databases, data structures or mechanisms possessing the characteristics required for embodiments of the present disclosure could alternatively be used. The blockchain 820 is a distributed chain of block data structures accessed by a network of nodes, referred to here as a miner network 818. Each block in the blockchain 820 includes a plurality of transaction data structures, each transaction referring or relating to a prior transaction. For example, in one embodiment each blockchain includes a Merkle of hash or digest values for transactions included in the block to arrive at a hash value for the block, which is itself combined with a hash value for a preceding block to generate a chain of blocks (blockchain). A new block of transactions is added to the blockchain by miner 826 software, hardware, firmware or combination systems in the miner network 818. The miners 826 are communicatively connected to sources of transactions (such as the broker 801) and access or copy the blockchain 820. A miner 826 undertakes validation of the substantive content of a transaction (such as the criteria defined therein) and adds a block of new transactions to the blockchain when a challenge is satisfied, typically such challenge involving a combination hash or digest for a prospective new block and a preceding block in the blockchain and some challenge criterion. Thus miners 826 in the miner network 818 may each generate prospective new blocks 828 for addition to the blockchain 820.

Where a miner 826 satisfies or solves the challenge and validates the transactions in a prospective new block such new block is added to the blockchain 820. Accordingly, the blockchain 820 provides a distributed mechanism for reliably verifying a data entity such as an entity constituting or representing the potential to consume a resource.

The detailed operation of such blockchains and the function of miners 826 in the miner network 818 is beyond the scope of this specification. The manner in which a blockchain 820 and network 818 of miners 826 operate ensures that only valid transactions are added within blocks to the blockchain 820 in a manner that is persistent within the blockchain 820. Transactions added erroneously or maliciously are not verifiable by other miners 826 in the network 818 and cannot persist in the blockchain. This attribute of blockchains is exploited by embodiments of the present disclosure to provide a distributed and reliable assurance for a resource provider 814 that resource consumption by a requester 810 is authorized or entitled. Thus, transactions generated by the broker 801 are passed to the miner network 818 for validation by miners 826 as prospective new blocks 828. Validated blocks are added to the blockchain 820 by the miner network 818. Blocks added to the blockchain 820 that are invalid (due to error or malice) do not persist in the blockchain in favor or blocks verifiable by other miners in the network 818. Thus, after a period of time (the length of which can be tailored by, for example, adapting the complexity of the challenge required to demonstrate proof of work by the miners 826 as part of the creation of new blocks), a new block is confirmed in the blockchain 820 at which time the resource provider 814 can operate with certainty that transactions in the confirmed block are valid and verifiable. Thus, in some embodiments the resource provider 814 may delay provision of the resource 816 to the requester 810 until a time when a block containing a transaction 824 for consumption of the resource 816 is confirmed in the blockchain 820 as a valid block.

In one embodiment, the machine learning modules 200 in a network 800 constitute at least part of the miner network 818 such that individual modules 200 can include functionality providing the services of a miner 826.

Thus, in this way, embodiments of the present disclosure provide for the confirmation of authorization or entitlement of the requester 810 to consume the resource 816 in a verifiable manner by way of a blockchain 820 and the plurality of miners 826. The authorization is validated and cannot be repudiated and provides certainty to the resource provider 814 even where the resource provider 814 has no relationship with or knowledge of the requester 810 or requester characteristics. The validation of the characteristics of the requester 810 are encoded in the initial transaction 822 along with a definition of criteria for consumption of the resource 816 that are tested and verified at the point and in the context of consumption of the resource 816. Thus, considerable decoupling is provided between the requester 810, the resource provider 814 and the consumption validation process undertaken by the miners 826 with reference to the blockchain 820 allowing these entities to operate in environments where the existence of any or each of these entities is transient, variable, untrusted or otherwise dynamic.

The process for consumption of the resource 816 by the requester 810 will now be considered with reference to FIG. 11 and the activities numbered in ellipses in the Figure which are referenced here in parentheses. Initially (1) the requester 810 requests validation of its characteristic 812 with the validator 802 of the broker 800. The validator 802 validates the characteristic 812 which may be undertaken with reference to external or internal services or features such as authorities and the like. To the extent that the requester's characteristic 812 is validated, the transaction generator 808 generates (2) an initial (first) transaction 822 representing the validation of the requester's characteristic 812. The nature, type and/or extent of validation of the characteristic 812 may be encoded, written, indicated or provided within or with the transaction 822. Alternatively, the nature, type and/or extent of validation of the characteristic 812 may be implied or indicated by the broker 801 itself or the validator 802 itself, either or both of which may specifically advertise, label or indicate itself as a particular type of validator. In some embodiments, the nature of the broker 800 or validator 802 is included in or associated with the transaction 822. Thus, where the validator 802 is specifically a user authenticator then transactions generated by the broker 801 in the basis of such validations are inherently representative of authenticated users, for example.

The initial transaction 822 further defines criteria for consumption of resources by the requester 810. Such criteria can be based on an extent or certainty of the validation undertaken by the validator 802 or a finding of the validator 802. For example, where the validator 802 determines that the requester 810 is operating in an insecure network environment based on network characteristics 812 of the requester 810, the transaction generator 808 can define criteria in the initial transaction 822 requiring any resource consumption involving the communication of data is provided with data encryption. Multiple criteria can be included in the transaction 822. The initial transaction is digitally signed by the broker 801 and subsequently published (3), communicated or otherwise provided to or accessed by miners 826 in the miner network 818 for validation and inclusion in a new block of the blockchain 820.

Transactions generated by the transaction generator 808 are associated with the requester 810 such that requester 810 and a corresponding transaction are associated with each other. In one embodiment, the requester 810 has associated a unique address, such as a long numerical address, and the transactions refer to the requester's address either explicitly or by way of a hash or digest of the address. In this way the broker 801, miners 826, resource provider 814 and requester 810 can identify transactions in the blockchain 820 relating to the requester 810. Such information regarding the consumption of resources by the requester 810 is therefore inherently relatively public (depending on the extent to which the system of FIG. 11 is public) or at least broadly available within the system of FIG. 11. In one embodiment, further privacy is provided for the resource consumption activities and behaviors of the requester 810 by providing the requester with multiple, potentially many, potentially unrelated addresses with which the requester can validate via the broker 800 and consume resources.

The requester 810 requests (4) consumption of the resource 816 providing the requester's address. The resource provider 814 initially requests (5) confirmation from the broker 800 that the requester's address has associated a valid transaction representing a current state of validation by the broker 800. The broker 800 checks a most recent transaction in the blockchain 800 associated with the requester's address to validate the requester 810. Such validation can include verifying that the most recent transaction for the requester's address is properly signed (with reference to the public/private key pair 804, 806). In some embodiments, the validation can extend to checking that the requester's most recent transaction does not exhaust any extent of authorization or entitlement to consume the (or any) resource 816. The results of the validation by the broker 801 are provided (6) to the resource provider 814.

Responsive to the requester validation by the broker 801, the resource provider 814 requests (7) the broker 801 generate a new (subsequent) transaction 824 corresponding to consumption, by the requester 810, of the resource 816. The request can include an extent or anticipated extent of consumption of the resource 816 in order that such extent can be reflected in the subsequent transaction 824. The broker 801 generates (8) the subsequent transaction 824 including criteria based on criteria for the initial transaction 822. The criteria for the subsequent transaction 824 can be adapted to reflect any depletion of an extent of authorization of consumption, or other criteria changes resulting from the consumption of a resource. The subsequent transaction 824 is digitally signed by the broker 801 and subsequently published (3), communicated or otherwise provided to or accessed by miners 826 in the miner network 818 for validation and inclusion in a new block of the blockchain 820.

The resource provider 814 uses confirmation of a new block in the blockchain 820 containing the subsequent transaction 824 as basis for allowing consumption of the resource 816 by the requester 810. The extent of consumption may be limited or constrained depending on indications the resource provider 814 supplied to the broker 801 when requesting generation of the subsequent transaction 824 (e.g. the anticipated extent of consumption).

FIG. 12 is a flowchart of an exemplary method of the broker 801 of FIG. 2 in accordance with an embodiment of the present disclosure. Initially at 302 the broker 801 receives a request for authorization to consume the (or a) resource. At 304 the validator 802 validates the requester characteristic 812. At 306 the first transaction 822 is generated and signed by, for example, encryption with the broker's private key 804 at 308. At 310 the first transaction 822 is published to the miner network 818 for validation by a miner 826 and inclusion in a new block in the blockchain 820. If a resource consumption request is received from the resource provider 814 at 312 the method proceeds to validate the requester 810 at 314. At 316 the subsequent transaction 824 is generated and signed at 318. At 320 the subsequent transaction 824 is published to the miner network 818 for validation by a miner 826 and inclusion in a new block in the blockchain 820.

Figure 13:
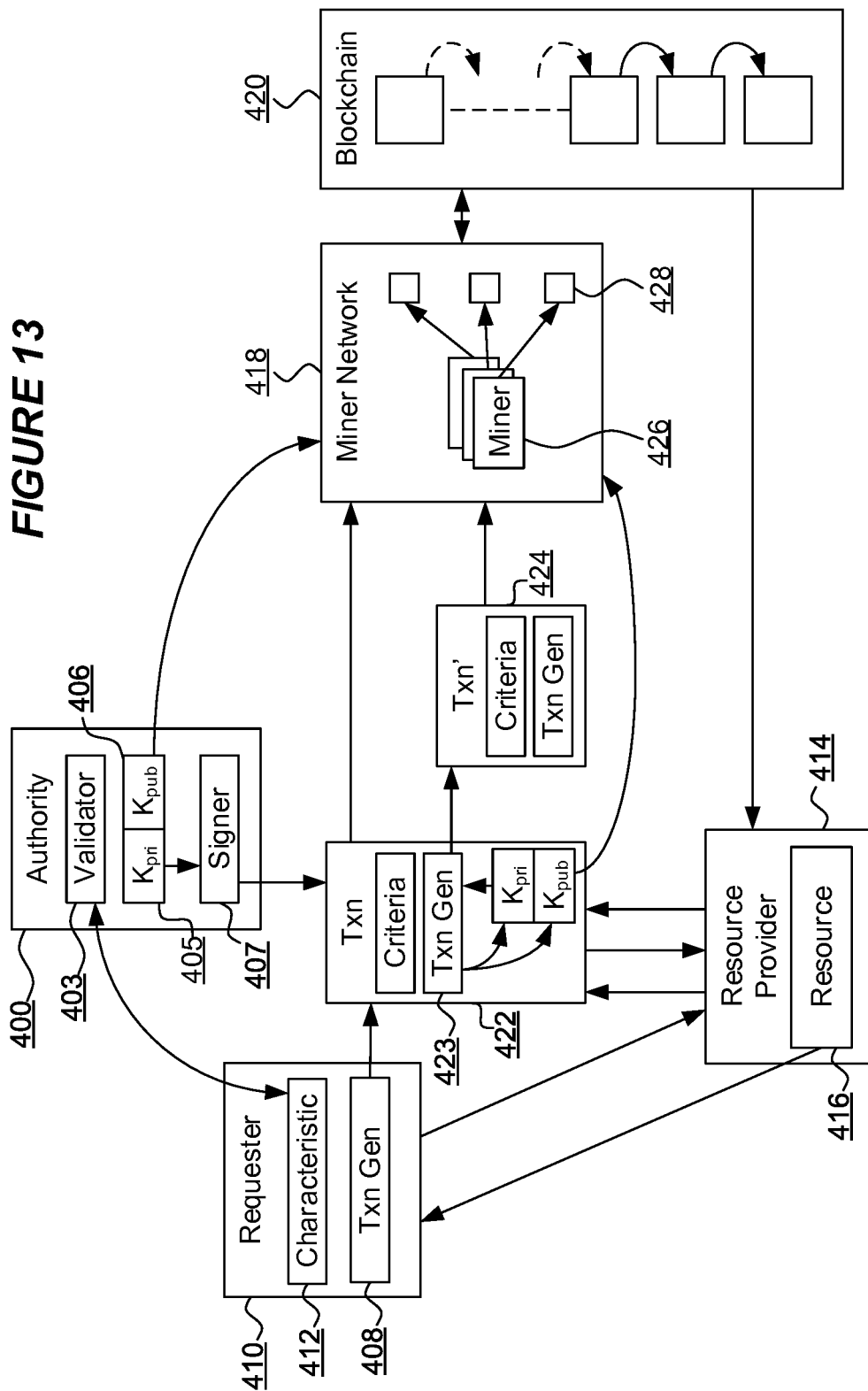
FIG. 13 is a component diagram of an alternative exemplary computer system arrangement in which a requester requests access to a resource provided by a resource provider in accordance with an embodiment of the present disclosure.
Figure 14:
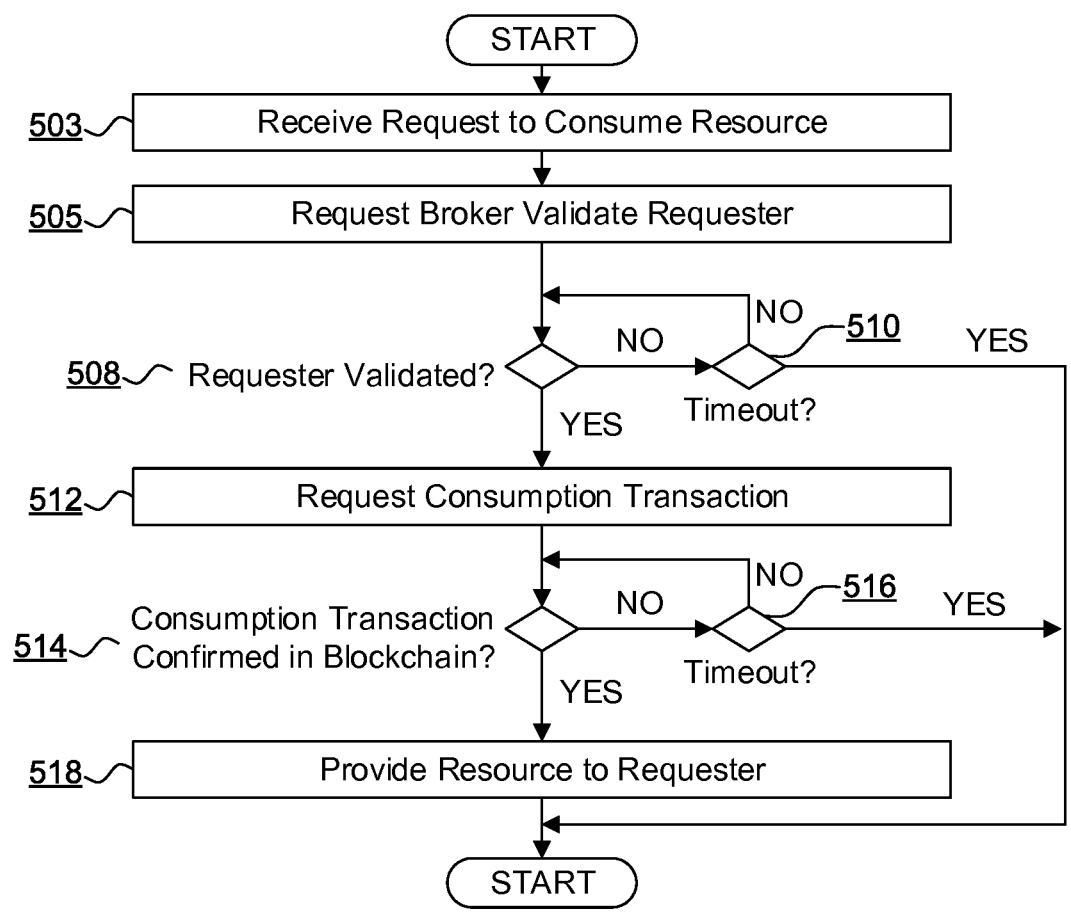
FIG. 14 is a flowchart of an exemplary method of the resource provider of FIG. 11 or FIG. 13 in accordance with an embodiment of the present disclosure.

FIG. 13 is a component diagram of an alternative exemplary computer system arrangement in which a requester 410 requests access to a resource 416 provided by a resource provider 414 in accordance with an embodiment of the present disclosure. Many of the features and components of FIG. 4 are identical to those described above with respect to FIG. 2 and these will not be repeated here. The system of FIG. 4 differs from that of FIG. 2 by the absence of a dedicated broker 200. In the arrangement of FIG. 4 the requester 410 includes a transaction generator 408 for generating initial transaction 422. While the initial transaction 422 is generated by the requester 410 itself, an authority component provides a validator 403 for validating the characteristic 412 of the requester 410 substantially as hereinbefore described. The authority is also operable to sign the initial transaction 422 by way of a signer 407 software or hardware component, for example using a public/private key pair 405, 406 of the authority. Thus, on the basis of the validation by validator 403 and the signing by signer 407 the initial transaction 422 constitutes a representation of the validation of the validator 403 consistent with the initial transaction of FIG. 2 described above.

In the arrangement of FIG. 4 each transaction in a sequence of transactions for the requester's consumption of the resource 416 is adapted to generate a subsequent transaction corresponding to such consumption without recourse to a broker. Thus the initial transaction 422 additionally includes a transaction generator 423 as a software component operable to generate a subsequent transaction 424. The transaction generator 423 is further operable to undertake the secure generation of a new public/private key pair for digitally signing the subsequent transaction 424. Thus the subsequent transaction 424 can be verifiably attributed to the initial transaction 422 by way of the digital signature of the transaction generator 423, and the initial transaction can be verifiably attributed to the authority component 400 by way of the digital signature of the signer 407. Accordingly the progeny of each transaction can be traced back to the authority without a need for a broker.

The transaction 422 also can include logic to undertake requester validation in response to a request from the resource provider 414 as hereinbefore described such that the transaction generator can validate that a requester has associated a signed transaction in a verified block in the blockchain 420. To this end the resource provider 414 or requester 410 may obtain the most recent transaction from the blockchain 420 based on an address of the requester in order to undertake such a request to the transaction for the requester validation.

The transaction 422 further includes logic, such as part of the transaction generator 423, to undertake the publication, communication, transmission or otherwise making available of a subsequent transaction 424 to the miner network 418 of miners 426 for verification and inclusion by a miner 426 in a new block of the blockchain 420. Notably, each subsequent transaction 424 also includes the logic of the transaction 422 such that transactions themselves adopt substantially the role of the broker of FIG. 2 in respect of the generation and signing of subsequent transactions.

FIG. 5 is a flowchart of an exemplary method of the resource provider 814, 414 of FIG. 2 or FIG. 3 in accordance with an embodiment of the present disclosure. Initially, at 503, the resource provider 814, 414 receives a request to consume the resource 216, 416 from a requester 810, 410. At 505 the provider 814, 414 requests that the broker 801 (or initial or latest transaction 422 in the arrangement of FIG. 4) validate the requester 810, 410. The method loops at 508 and 510 until the requester 810, 410 is validated or a predefined timeout period elapses. Where the requester 810, 410 is validated the method requests a new (subsequent) consumption transaction 814, 414 at 512. The method loops at 514 and 516 until the new consumption transaction 814, 414 is confirmed in the blockchain 820, 420 or a predefined timeout period elapses. Where the new consumption transaction 814, 414 is confirmed in the blockchain 820, 420, the method proceeds to provide the resource 816, 416 to the requester 810, 410 for consumption at 518.

Figure 15:
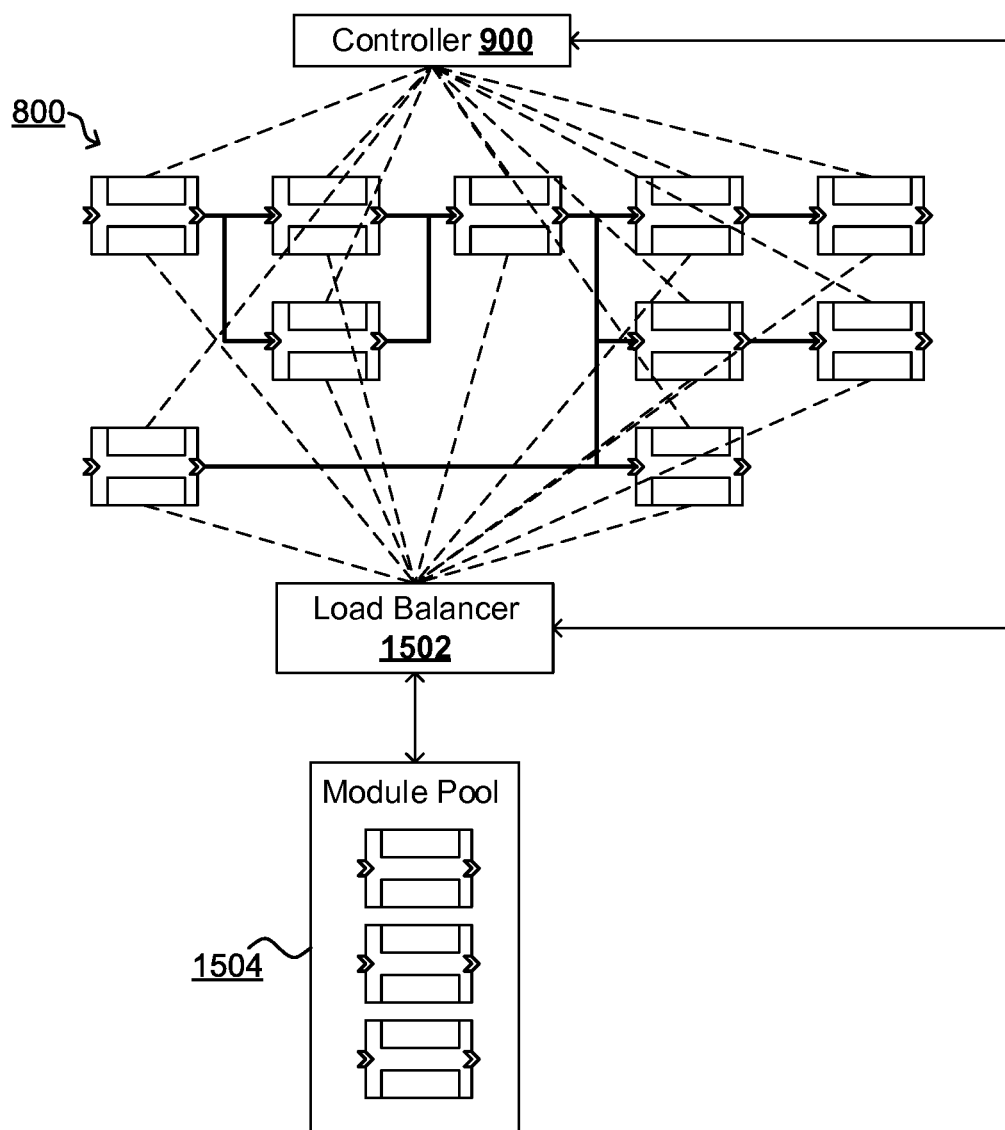
FIG. 15 is a component diagram of a plurality of machine learning modules managed by a load balancing component.

FIG. 15 is a component diagram of a plurality of machine learning modules 200 managed by a load balancing component 1502. The machine learning modules 200 can be arranged as a network 800 as illustrated or otherwise provided individually for consumption by a consuming entity such as a software application or the like. The load balancing component 1502 is a software, hardware, firmware or combination component arranged to receive a request for a machine learning task and select a module from a module pool 1504 to provide the machine learning task. For example, requests can be received from consuming entities such as applications requiring machine learning functionality. Additionally or alternatively, requests can be received over a network from remote entities where machine learning functionality is to be provided as a service, such as a cloud software service.

The module pool 1504 is a repository storing machine learning modules 200 for deployment to machine learning tasks. The modules 200 in the pool 1504 may be deployed for machine learning tasks intermittently whereby they are removed from the pool and executed to perform a required task. When a task is complete a deployed module may be returned to the pool 1504. Alternatively, the modules 200 in the pool may be deployed while still remaining in the pool such that they are shared between two consuming processes such as two applications sharing a machine learning module

200. In such embodiments, the a machine learning module 200 may include a plurality of storage components 206, one for each consuming entity, such that a model of multiple target functions ƒ can be developed within a single module 200. Thus, the module pool 1504 can be a virtual pool by way of associating modules together to constitute the pool, such as by reference to modules that may not be physically collocated (e.g. on the same computing hardware, virtual machine, at the same site, etc.)

Each module in the module pool 1504 has associated a metric of resource utilization by the module such that a load on a particular module or a cost of using a particular module can be determined. For example, the metric can include a measure of resource utilization by the module over a period of time. Additionally or alternatively, the metric can include a volume of machine learning tasks performed by the module in a period of time. Other suitable metrics for indicating a load or resource utilization of a module will be apparent to those skilled in the art.

The load balancer 1502 is communicatively connected to the module pool 1504 and may additionally or alternatively be communicatively connected to deployed modules such as modules in a network of modules 800. In one embodiment, the load balancer 1502 is communicatively connected to a controller 900 of the network 800 in order that machine learning module requirements (i.e. machine learning task requests) can be received therefrom.

In response to a request for a machine learning task, the load balancer 1502 selects a module 200 from the module pool 1504 for performing the task. The selection is performed based on the metric associated with each module. In some embodiments, the selection uses a load-balancing algorithm such as are known in the art, for example: round robin; weighted round robin; least connection; weighted least connection; agent-based; chained failover; weighted response time; etc.

In one embodiment, the load balancer 1502 is provided as a distributed algorithm across a plurality of communicatively connected modules 200, such as modules 200 in a network 800. Thus, in such embodiments, modules share metrics with each other in order that a determination can be made as to which module is to perform a requisite machine learning task.

Figure 16:
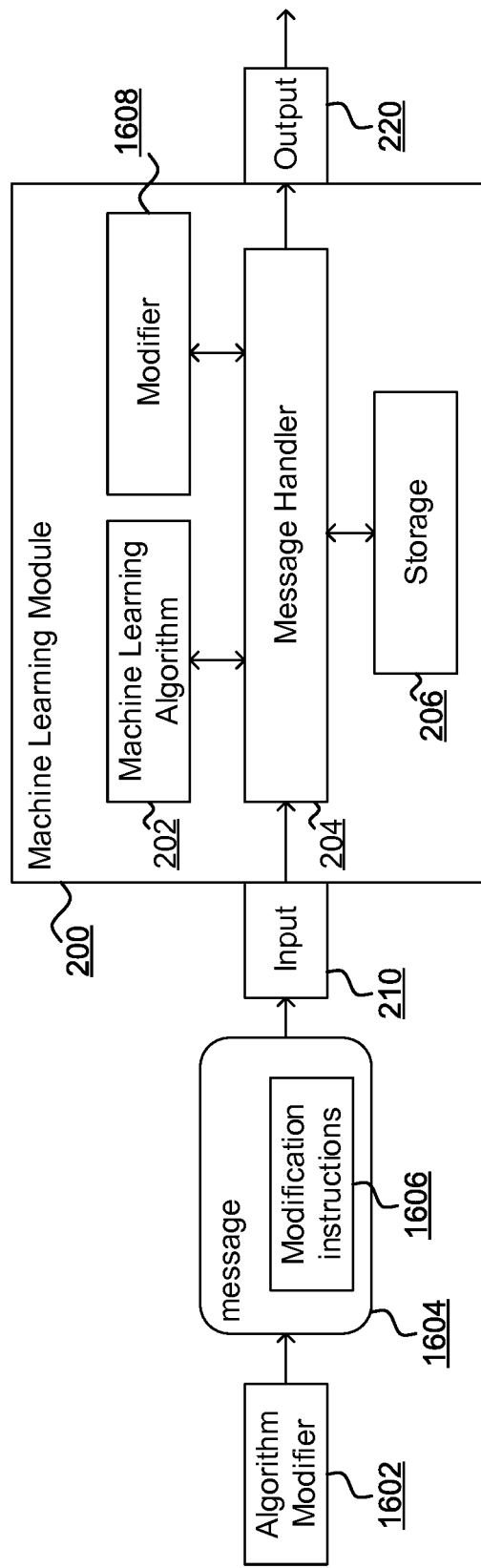
FIG. 16 is a component diagram of an arrangement for modifying a machine learning algorithm in a machine learning module in accordance with embodiments of the present disclosure.

FIG. 16 is a component diagram of an arrangement for modifying a machine learning algorithm 202 in a machine learning module 200 in accordance with embodiments of the present disclosure. The arrangement of the machine learning module 200 of FIG. 16 is consistent with those previously described and further includes a modifier component 160 as a software routine adapted to modify the machine learning algorithm 202 in response to a modification message 1604 received via the input interface 210. The modification message 1604 includes modification instructions 1606 executable by the modifier 1608 of the module 200 to effect the modification of the machine learning algorithm. For example, the instructions 1606 can be specified as executable instructions in a JSON message, or alternatively the instructions can refer to predetermined modification codes each indicating a predetermined type of modification to be performed by the modifier 1608.

Examples of modifications that can be performed by the modifier 1608 include: updating the machine learning algorithm 202; patching the machine learning algorithm 202; reconfiguring the machine learning algorithm 202; changing one or more libraries, subroutines, functions or procedures of the machine learning algorithm 202; replacing the machine learning algorithm 202. In one embodiment, additional, updated, revised or alternative functions or code for the machine learning algorithm 202 to be applied by the modifier 1608 are included with the message 1604 or in a further message referenced by, or referencing, the message 1604. For example, where the modification instructions 1606 indicate a replacement of the machine learning algorithm with a replacement algorithm, the replacement algorithm can be provided or referenced by the message 1604. The modifier 1608 thus receives the message, via the message handler 204, and undertakes the instructed modification to the machine learning algorithm 202.

Accordingly, the message handler 204 is configured to receive and process modification messages 1604 and to provide such messages to the modifier 1608. In one embodiment the messages are digitally signed, encrypted or otherwise verifiable or an origin of the messages, such as an algorithm modifier component 1602 external to the module, is authenticated using one or more techniques as will be apparent to those skilled in the art.

Where the module 200 is provided in a network of modules as previously described, the modification message 1604 can be directed to multiple modules to effect modification of machine learning algorithms in multiple modules at the same time. The modules may be addressed individually, such as by way of a reference, hash or other identifier of the modules, to target the message 1604. Alternatively, the modification message 1604 can be broadcast or multicast to a plurality of modules in one or more networks of modules. Where modification messages are broadcast modules can be self-selecting for modification based on predefined criteria stored in, with or in association with the modules and/or the modification message 1604. For example, the message 1604 can include criteria for satisfaction by a receiving module 202 to determine whether the module will apply the modification instructions to effect a modification. One such criteria may be whether a machine learning algorithm is of a particular type, class or is a particular algorithm or version of an algorithm. Thus, messages directed to modify a particular machine learning algorithm to a update to a latest version can include criteria that a module includes the particular algorithm for the modification to be effected. Similarly, other criteria could apply such as: whether an algorithm is supervised or unsupervised; metrics of load, resource consumption or usage of an algorithm in a module; a volume of storage employed by the algorithm; connections of a module to other modules in a network via one or more communication channels; and other criteria as will be apparent to those skilled in the art. Accordingly, when implemented, such criteria can permit the broadcast of modification messages with modules self-selecting for modification of algorithms based on the criteria.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of executing a software module comprising a machine learning algorithm as an executable software component configurable to approximate a function relating a domain data set to a range data set, a data store, and a message handler as an executable software component arranged to receive input data and communicate output data for the module, wherein the message handler is adapted to determine domain parameters for the algorithm based on the input data and to generate the output data based on a result generated by the algorithm, the method comprising:
generating a message as input data for the software module, the message comprising instructions for execution by the software module to effect a modification of the machine learning algorithm of the software module.

2. The method of claim 1, wherein the message includes a replacement machine learning algorithm and the instructions cause the replacement of the machine learning algorithm in the software module with the replacement machine learning algorithm.

3. The method of claim 1, wherein each software module is a software object having functional methods and attributes.

4. The method of claim 1, wherein each software module in execution is serializable for communication of the software module in a state of operation.

5. The method of claim 4, wherein a network of software modules is serializable based on serialization of each software module in execution for communication of the network in a state of operation.

6. The method of claim 1, wherein the input data includes an indication of a type of input data including one or more of: training data or non-training data.

7. The method of claim 1, wherein the input data includes training data including an indication of a state of one or more training examples as a positive training example or a negative training example.

8. The method of claim 1, wherein the input data includes training data including an indication of a result associated with the training data.

9. The method of claim 1, wherein the range data set includes one or more of: one or more classifications of data input to a machine learning algorithm; one or more clusters associated with data input to a machine learning algorithm; or one or more values of dependent variables for data input to a machine learning algorithm.

10. The method of claim 1, wherein each of the software modules is encrypted.

11. The method of claim 1, wherein output data communicated is encrypted.

12. A computer system comprising:
a processor and memory storing computer program code for executing a software module comprising a machine learning algorithm as an executable software component configurable to approximate a function relating a domain data set to a range data set, a data store, and a message handler as an executable software component arranged to receive input data and communicate output data for the module, wherein the message handler is adapted to determine domain parameters for the algorithm based on the input data and to generate the output data based on a result generated by the algorithm, by:
generating a message as input data for the software module, the message comprising instructions for execution by the software module to effect a modification of the machine learning algorithm of the software module.

13. A non-transitory computer-readable storage medium storing a computer program element comprising computer program code to, when loaded into a computer system and executed thereon, cause the computer system to perform the method as claimed in claim 1.

* * * * *